US012645058B2

(12) United States Patent
Tokita

(10) Patent No.: US 12,645,058 B2
(45) Date of Patent: Jun. 2, 2026

(54) ZOOM LENS AND IMAGE PICKUP APPARATUS AND IMAGE PICKUP SYSTEM HAVING THE SAME

(71) Applicant: CANON KABUSHIKI KAISHA, Tokyo (JP)

(72) Inventor: Tomoki Tokita, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 570 days.

(21) Appl. No.: 18/172,372

(22) Filed: Feb. 22, 2023

(65) Prior Publication Data
US 2023/0273414 A1 Aug. 31, 2023

(30) Foreign Application Priority Data
Feb. 28, 2022 (JP) ................................. 2022-029164

(51) Int. Cl.
*G02B 15/14* (2006.01)
*G02B 13/00* (2006.01)
*G02B 27/00* (2006.01)

(52) U.S. Cl.
CPC .. *G02B 15/145113* (2019.08); *G02B 13/0045* (2013.01); *G02B 27/0025* (2013.01)

(58) Field of Classification Search
CPC ........ G02B 9/62; G02B 9/64; G02B 13/0045; G02B 13/0015; G02B 13/18;
(Continued)

(56) References Cited

U.S. PATENT DOCUMENTS 5,642,224 A * 6/1997 Suzuki ................. G02B 27/646
359/557
2003/0142412 A1 * 7/2003 Shirasuna ...... G02B 15/143105
359/690
(Continued)

FOREIGN PATENT DOCUMENTS

CN 106842528 A 6/2017
CN 113176660 A 7/2021
(Continued)

OTHER PUBLICATIONS

Combined Search and Examination Report issued in corresponding GB Patent Application No. 2302851.7, dated Aug. 29, 2023.
(Continued)

*Primary Examiner* — Travis S Fissel
(74) *Attorney, Agent, or Firm* — Carter, DeLuca & Farrell LLP

(57) ABSTRACT
A zoom lens includes, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. During zooming, each distance between adjacent lens units changes. During zooming from a wide-angle end to a telephoto end, the first lens unit moves toward the object side, a distance between the third lens unit and the fourth lens unit decreases, and a distance between the fourth lens unit and the fifth lens unit decreases. The number of optical elements each having a refractive power in the first lens unit is two or less. Predetermined conditions are satisfied.

18 Claims, 16 Drawing Sheets

(58) Field of Classification Search
CPC ........... G02B 27/0025; G02B 27/0012; G02B 27/0172; G02B 15/146; G02B 15/145113; H04N 5/222; H04N 5/2254
USPC ............... 359/676, 656–658, 708, 713, 749, 359/756–762
See application file for complete search history.

(56) References Cited

U.S. PATENT DOCUMENTS

| | | | |
|---|---|---|---|
| 2015/0098136 A1 | 4/2015 | Hashimoto | |
| 2017/0003486 A1 | 1/2017 | Inoue | |
| 2020/0241264 A1* | 7/2020 | Umeda | G02B 15/144113 |
| 2021/0231931 A1* | 7/2021 | Mori | G02B 15/144113 |

FOREIGN PATENT DOCUMENTS

| | | |
|---|---|---|
| CN | 113820841 A | 12/2021 |
| JP | 2004-061681 A | 2/2004 |
| JP | 2016-031419 A | 3/2016 |
| JP | 2016080824 A | 5/2016 |
| JP | 2020-170102 A | 10/2020 |
| JP | 2021-081660 A | 5/2021 |
| JP | 2021-117351 A | 8/2021 |
| JP | 2021-173892 A | 11/2021 |
| WO | 2015/146067 A1 | 10/2015 |
| WO | 2019/049370 A1 | 3/2019 |

OTHER PUBLICATIONS

Notice of Reasons for Refusal issued by the Japanese Patent Office on Oct. 7, 2025 in corresponding JP Patent Application No. 2022-029164, with English translation.
Chinese Office Action issued by the China National Intellectual Property Administration on Mar. 25, 2026 in corresponding CN Patent Application No. 202310167343.6, with English translation.

* cited by examiner

WIDE-ANGLE END

TELEPHOTO END

WIDE-ANGLE END

TELEPHOTO END

ZOOM LENS AND IMAGE PICKUP APPARATUS AND IMAGE PICKUP SYSTEM HAVING THE SAME

BACKGROUND OF THE INVENTION

Field of the Invention

The aspect of the embodiments relates to a zoom lens suitable for digital video cameras, digital still cameras, broadcast cameras, silver-halide film cameras, surveillance cameras, and the like.

Description of the Related Art

Zoom lenses used in image pickup apparatuses are demanded to have high optical performance, ensure large zooming ratios, reduce an aberration fluctuation during zooming, and have small sizes and light weights. As a zoom lens that meets these demands, a zoom lens is known in which the number of optical elements each having a refractive power in a lens unit closest to an object (first lens unit) is two or less.

As a zoom lens including a first lens unit consisting of two lenses, Japanese Patent Application Laid-Open No. ("JP") 2021-117351 (Example 7) discloses a zoom lens including, in order from an object side to an image side, first through fifth lens units having positive, negative, positive, positive, and negative refractive powers. Moreover, JP 2021-081660 (Example 2) discloses a zoom lens including, in order from an object side to an image side, first through sixth lens units having positive, negative, positive, positive, negative, and negative refractive powers.

However, in the zoom lens disclosed in JP 2021-117351, the refractive power of the first lens unit is too weak. Hence, the refractive power of the third lens unit is to be increased so that a large zooming ratio is provided, and as a result, the number of lenses in the third lens unit increases, making it difficult to reduce the weight. In the zoom lens disclosed in JP 2021-081660, during zooming from a wide-angle end to a telephoto end, a changing amount in a distance between the third lens unit and the fourth lens unit is too large relatively to a changing amount in a distance between the fourth lens unit and the fifth lens unit. Hence, the number of lenses in the third lens unit and the fourth lens unit needs to be increased so that an aberration fluctuation during zooming is reduced, which makes it difficult to reduce the weight.

In general, in order to have a large zooming ratio, a zoom lens needs to have an increased lateral magnification variation amount per unit moving amount of each lens unit during zooming from a wide-angle end to a telephoto end. Thus, a refractive power of each lens unit needs to be increased, but this makes it difficult for each lens unit to correct aberration. For this reason, if each lens unit is moved too much during zooming, an aberration fluctuation increases and high optical performance cannot be achieved over an entire zoom range. For a reduction of an aberration fluctuation during zooming, aberration can be corrected in each lens unit by increasing the number of lenses in each lens unit, but this makes it difficult to reduce the weight. Thus, in a zoom lens having a small number of lenses, it is important to optimize the refractive power of each lens unit and the moving amount of each lens unit during zooming.

SUMMARY OF THE INVENTION

The present disclosure provides a zoom lens that has high optical performance over an entire zoom range, and that is capable of realizing a large zooming ratio, a small size and a small weight, and an image pickup apparatus and an image pickup system having the zoom lens.

A zoom lens according to one aspect of the embodiments includes, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. During zooming, each distance between adjacent lens units changes. During zooming from a wide-angle end to a telephoto end, the first lens unit moves toward the object side, a distance between the third lens unit and the fourth lens unit decreases, and a distance between the fourth lens unit and the fifth lens unit decreases. The number of optical elements each having a refractive power in the first lens unit is two or less. Predetermined conditions are satisfied.

An image pickup apparatus including the zoom lens also constitutes another aspect of the embodiments.

Further features of the present disclosure will become apparent from the following description of exemplary embodiments with reference to the attached drawings.

DESCRIPTION OF THE EMBODIMENTS

Figures 1A, 1B:
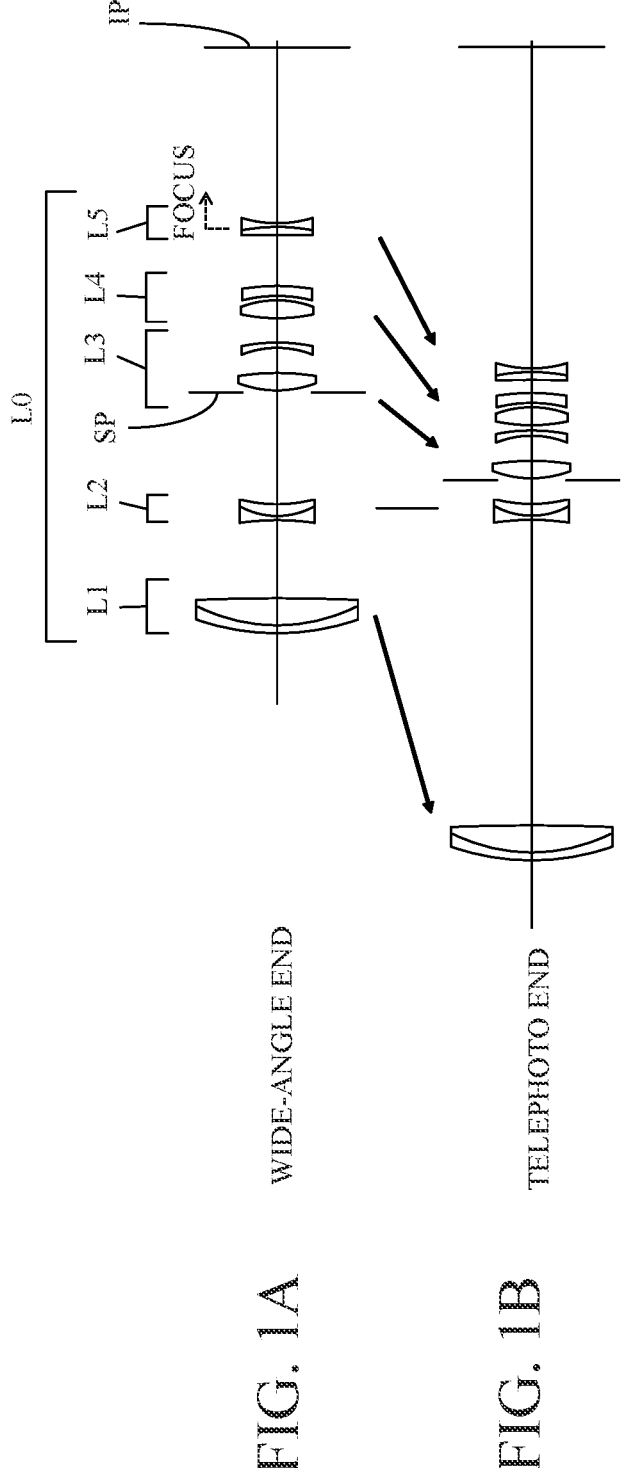
FIGS. 1A and 1B are sectional views of a zoom lens at a wide-angle end (FIG. 1A) and a telephoto end (FIG. 1B) according to Example 1.
Figure 2A:
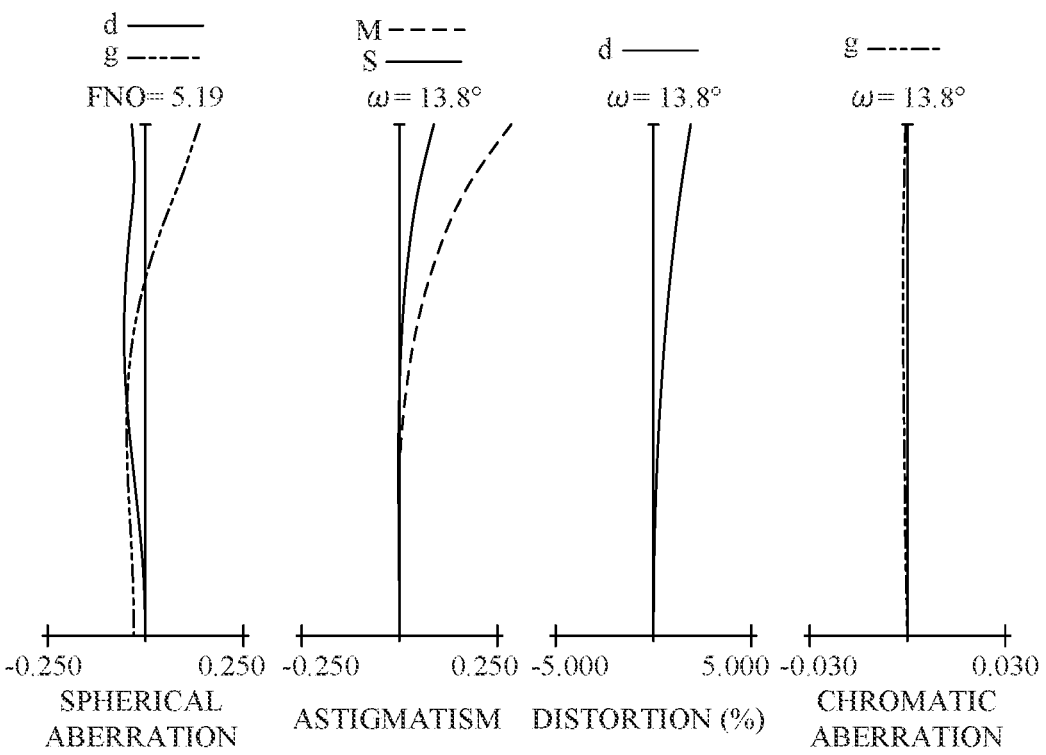
FIGS. 2A and 2B are longitudinal aberration diagrams of the zoom lens at the wide-angle end (FIG. 2A) and a telephoto end (FIG. 2B) according to Example 1.
Figure 2B:
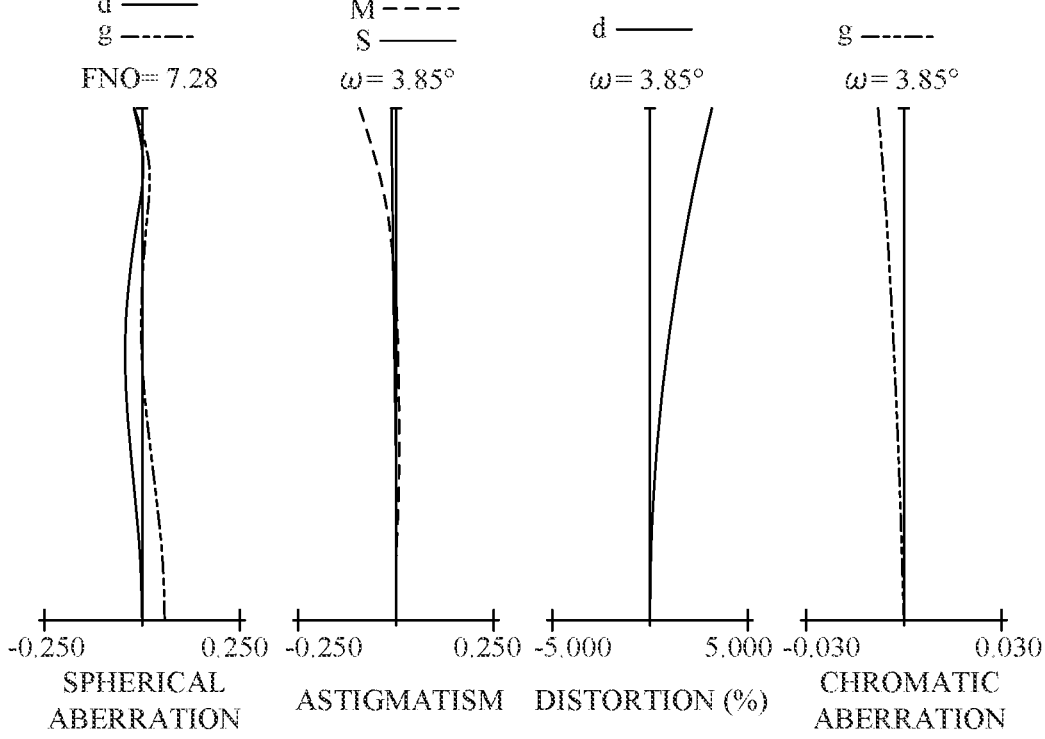
Figure 3A:
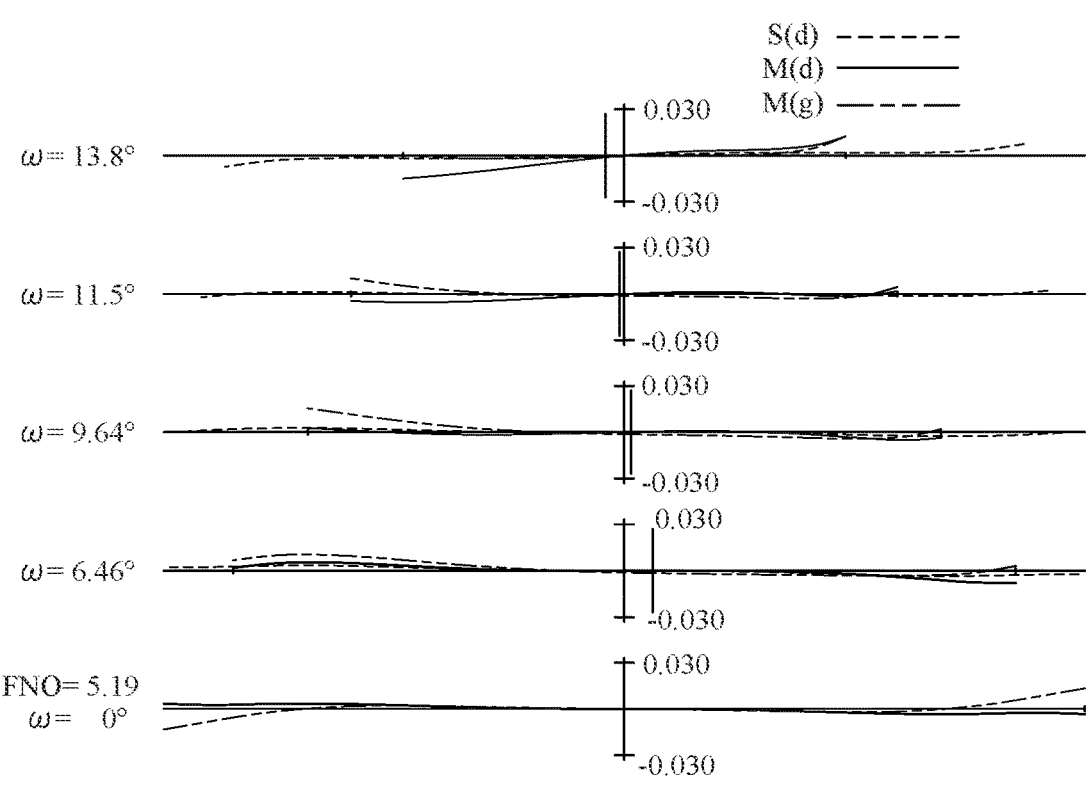
FIGS. 3A and 3B are lateral aberration diagrams of the zoom lens at the wide-angle end (FIG. 3A) and the telephoto end (FIG. 3B) according to Example 1.
Figure 3B:
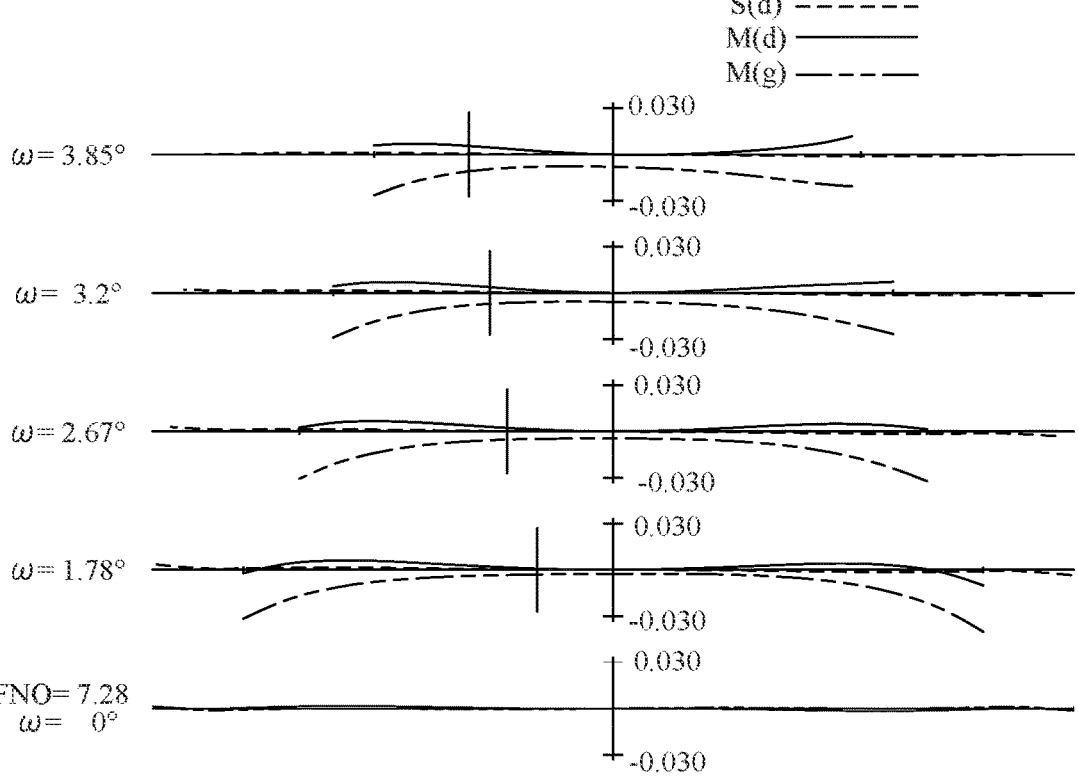
Figures 4A, 4B:
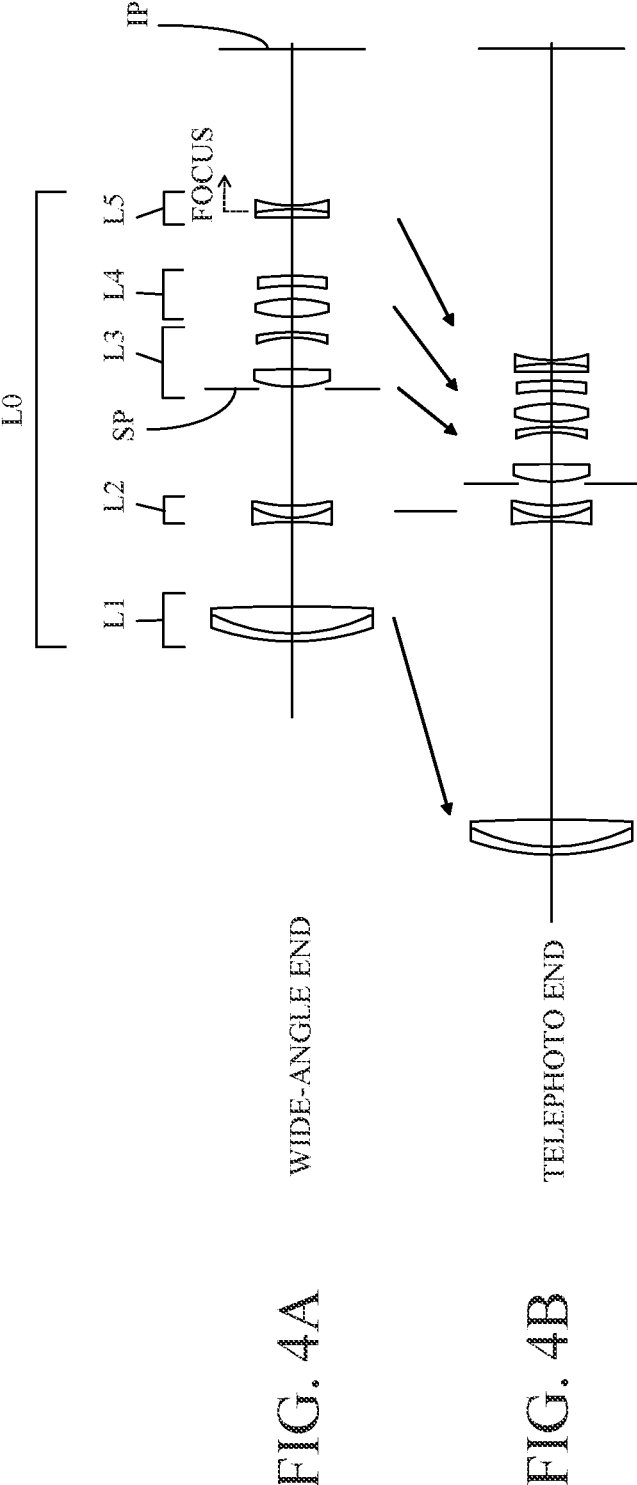
FIGS. 4A and 4B are sectional views of a zoom lens at a wide-angle end (FIG. 4A) and a telephoto end (FIG. 4B) according to Example 2.
Figure 5A:
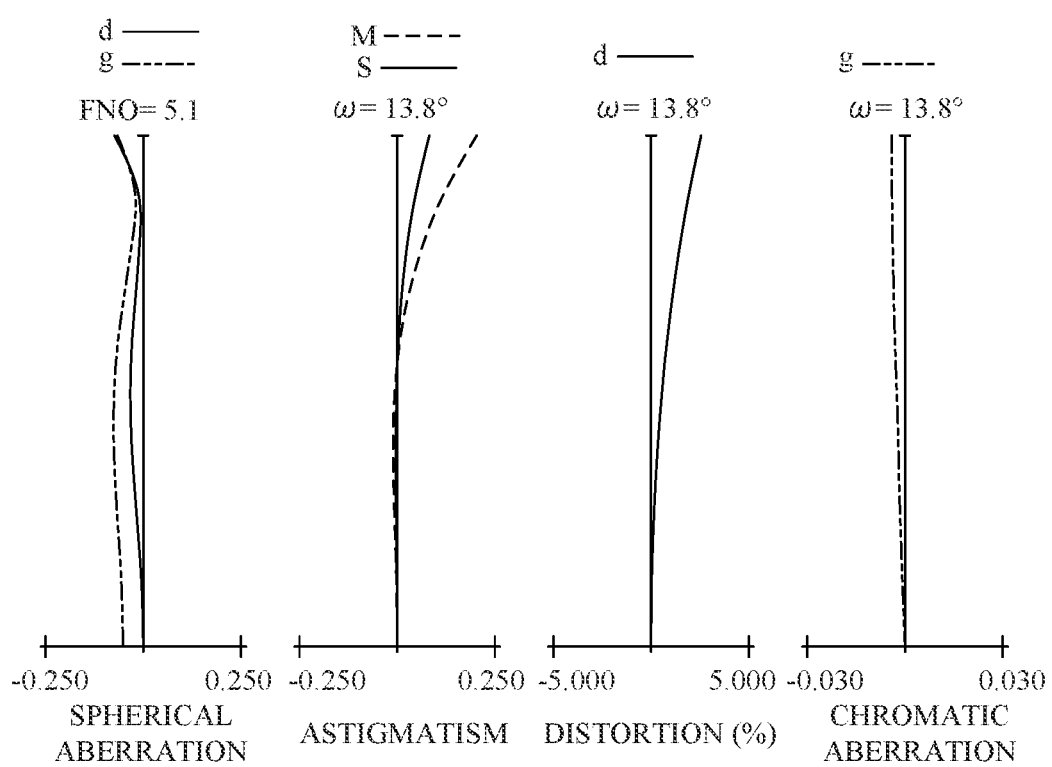
FIGS. 5A and 5B are longitudinal aberration diagrams of the zoom lens at the wide-angle end (FIG. 5A) and a telephoto end (FIG. 5B) according to Example 2.
Figure 5B:
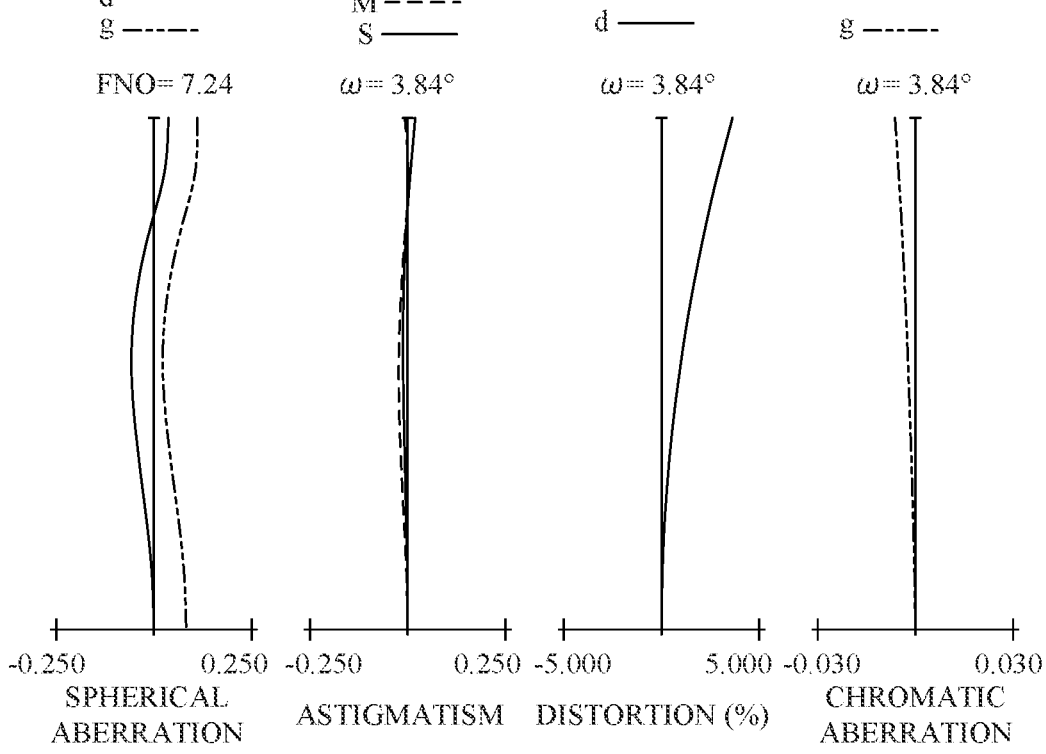
Figure 6A:
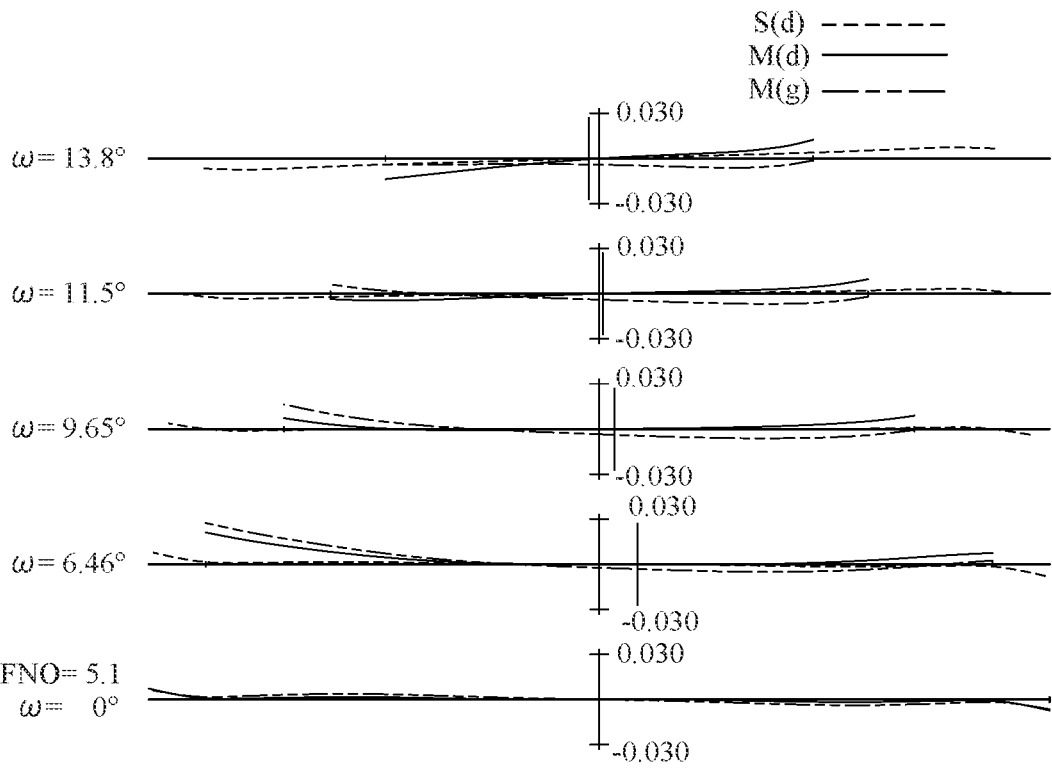
FIGS. 6A and 6B are lateral aberration diagrams of the zoom lens at the wide-angle end (FIG. 6A) and the telephoto end (FIG. 6B) according to Example 2.
Figure 6B:
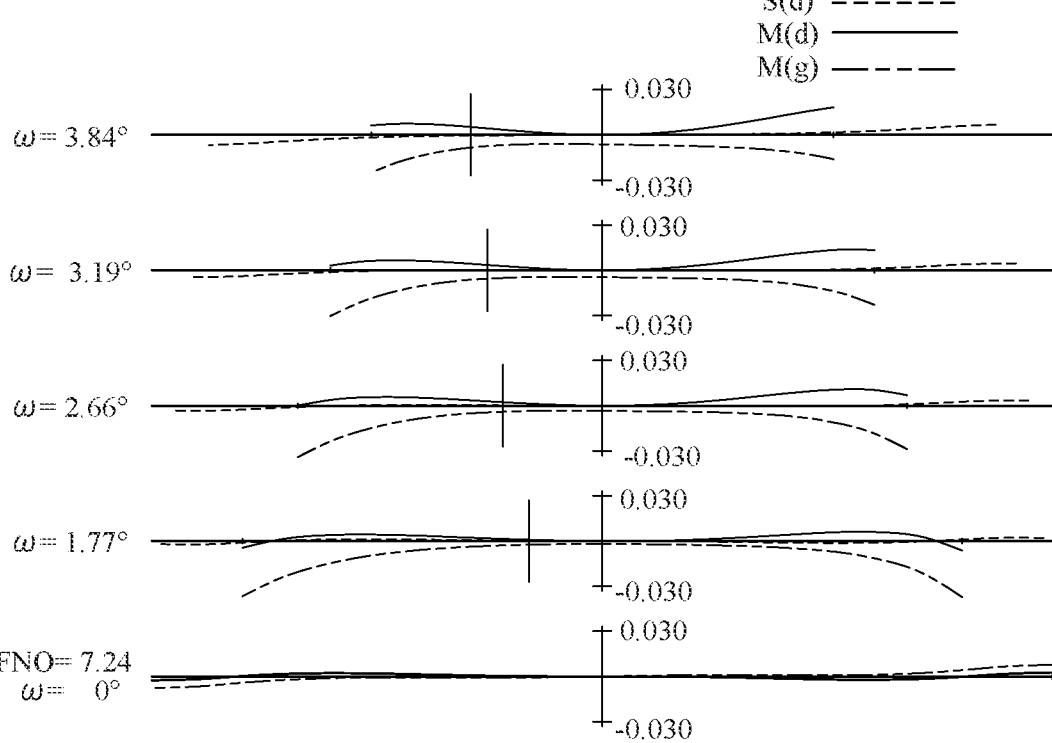
Figures 7A, 7B:
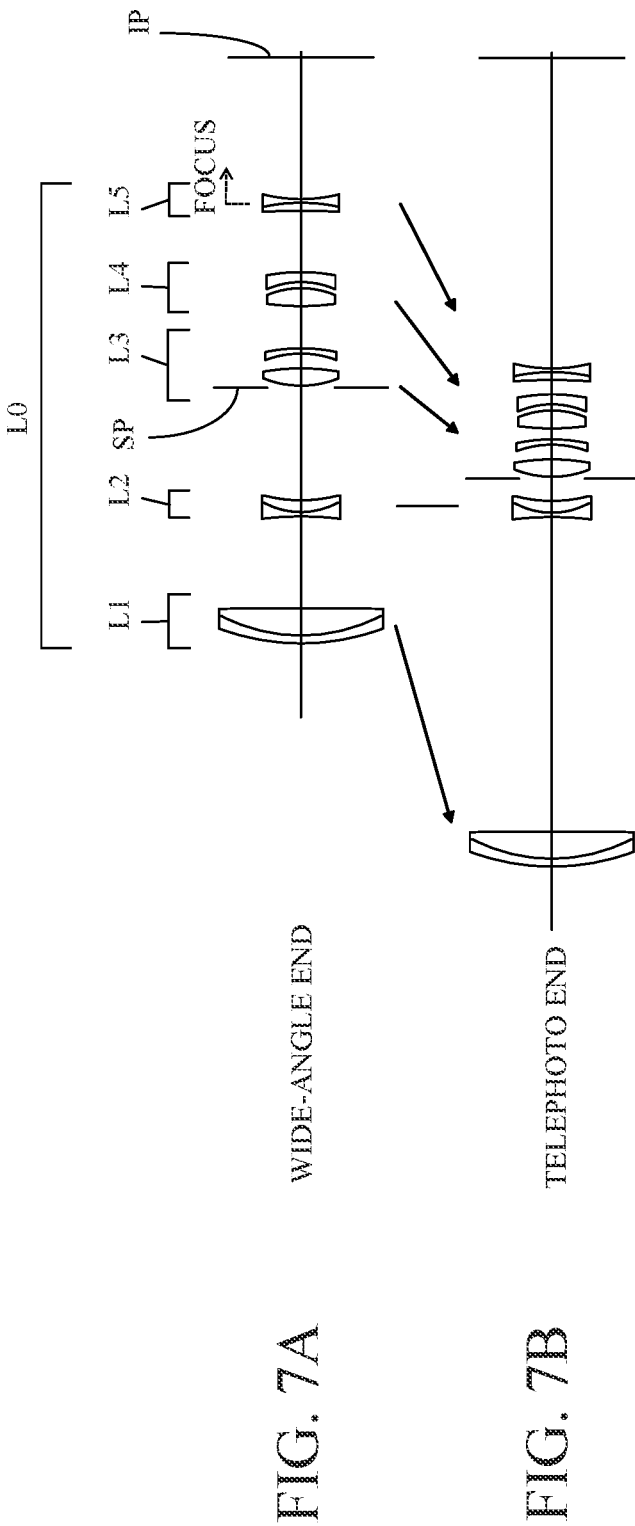
FIGS. 7A and 7B are sectional views of a zoom lens at a wide-angle end (FIG. 7A) and a telephoto end (FIG. 7B) according to Example 3.
Figure 8A:
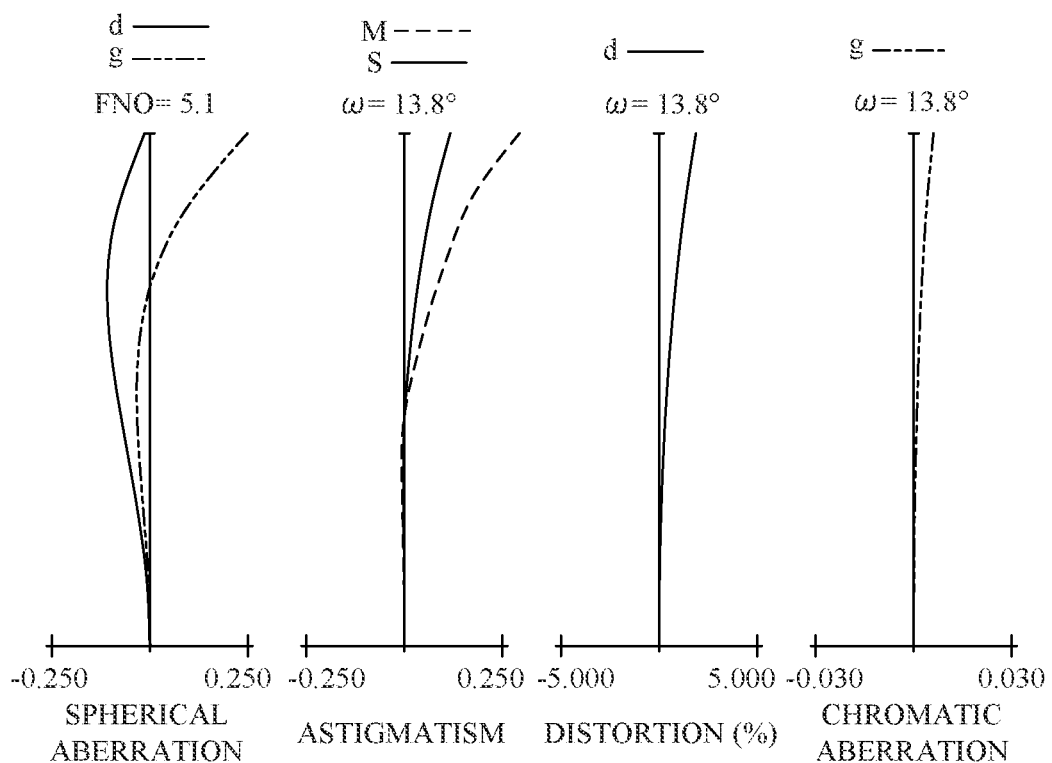
FIGS. 8A and 8B are longitudinal aberration diagrams of the zoom lens at the wide-angle end (FIG. 8A) and a telephoto end (FIG. 8B) according to Example 3.
Figure 8B:
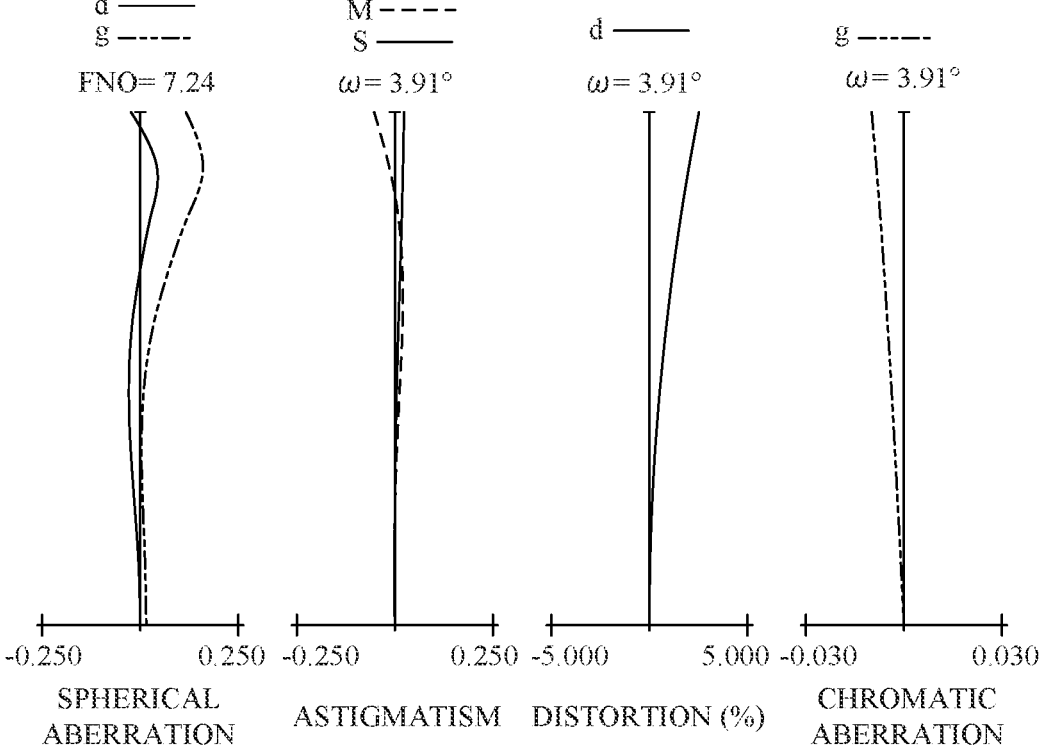
Figure 9A:
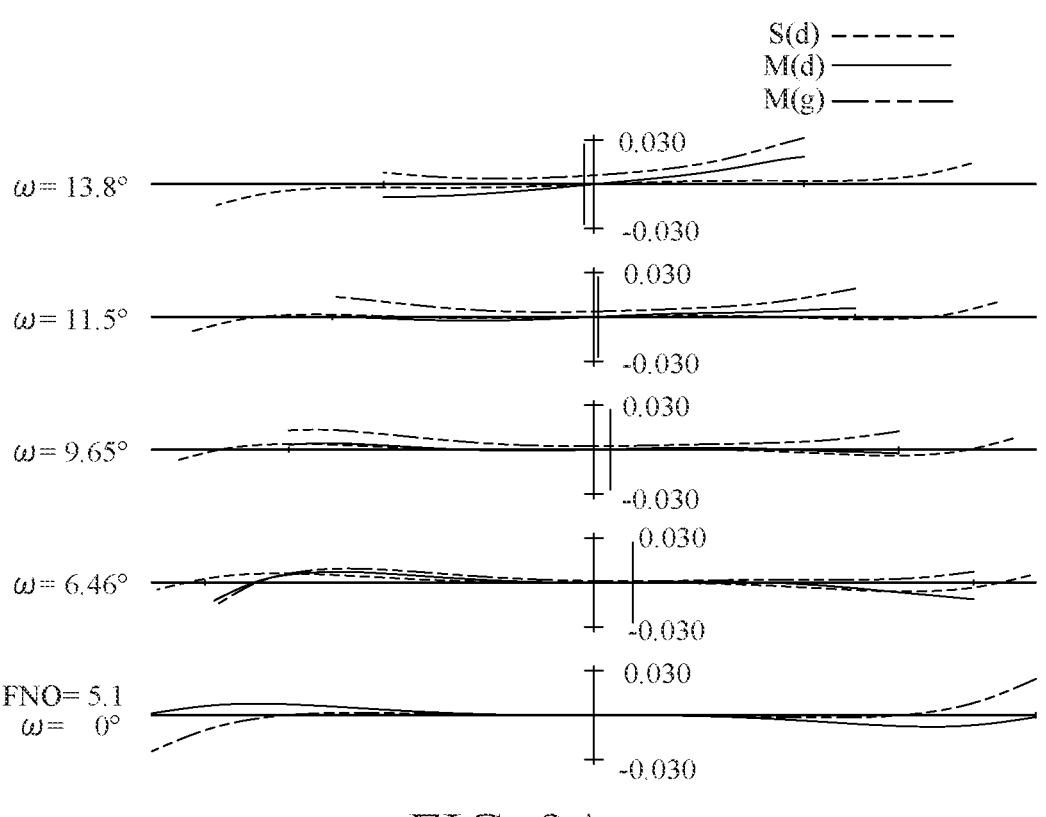
FIGS. 9A and 9B are lateral aberration diagrams of the zoom lens at the wide-angle end (FIG. 9A) and the telephoto end (FIG. 9B) according to Example 3.
Figure 9B:
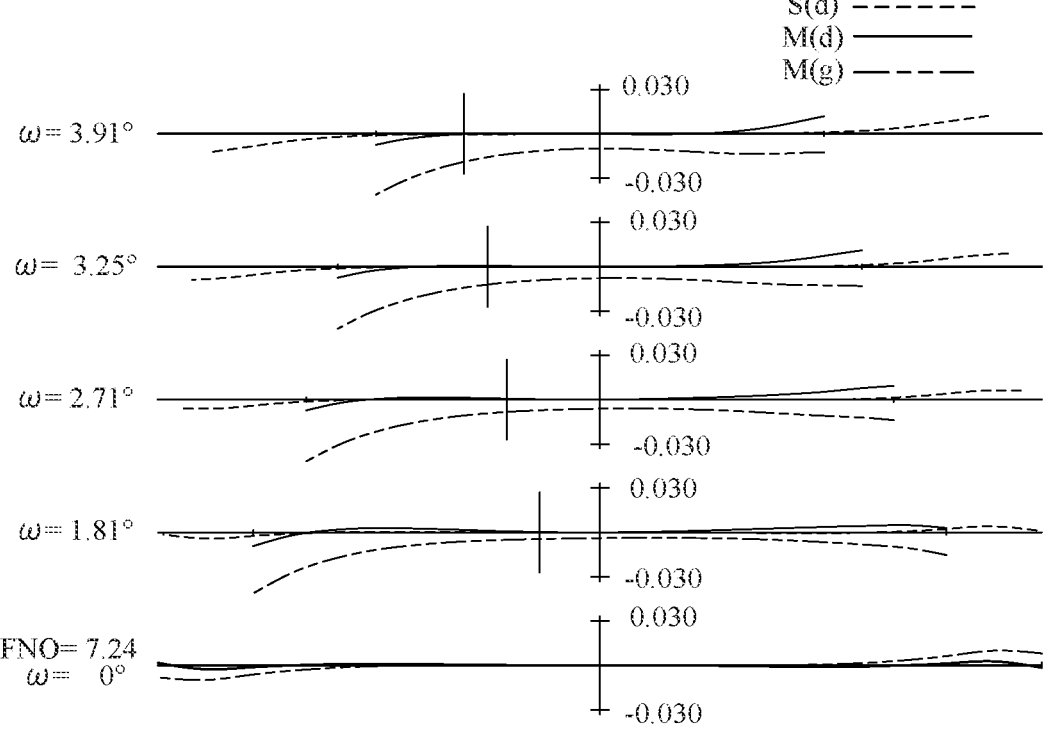

Hereinafter, a description is given of a zoom lens of the present disclosure and embodiments of an image pickup apparatus and an image pickup system having the zoom lens with reference to the accompanying drawings.

FIGS. 1A, 4A, 7A, 10A, and 13A are sectional views at the wide-angle end of zoom lenses L0 according to Examples 1 to 5, respectively. FIGS. 1B, 4B, 7B, 10B, and 13B are sectional views at the telephoto end of the zoom lenses L0 according to Examples 1 to 5, respectively. The zoom lens L0 according to each example is used in image pickup apparatuses such as digital video cameras, digital still cameras, broadcast cameras, silver-halide film cameras, surveillance cameras, and the like.

In each lens sectional view, the left side is an object side and the right side is an image side. The zoom lens L0 according to each example includes a plurality of lens units. In each example, a lens unit is a group of lenses that integrally move as a whole during zooming or that do not move during zooming. That is, in the zoom lens L0 according to each example, each distance between adjacent lens units changes during zooming from the wide-angle end to the telephoto end. A lens unit may consist of one lens or may include a plurality of lenses. In addition, a lens unit may include an aperture diaphragm.

In each lens sectional view, Li denotes an i-th (i is a natural number) lens unit counted from the object side among the lens units included in the zoom lens L0.

SP denotes an aperture diaphragm. IP denotes an image plane, and in a case where the zoom lens L0 according to each example is used as an imaging optical system for a digital still camera or a digital video camera, an image pickup plane of a solid image sensor (photoelectric conversion element) such as a CCD sensor and CMOS sensor is disposed on the image plane IP. In a case where the zoom lens L0 according to each example is used as an imaging optical system of a silver-halide film camera, a photosensitive surface corresponding to a film surface is disposed on the image plane IP.

In the zoom lens L0 according to each example, during zooming from the wide-angle end to the telephoto end, each lens unit moves as indicated by a solid arrow in each sectional view in FIGS. 1A, 4A, 7A, 10A, and 13A. During focusing from an object at an infinite distance to an object at a closest distance, each lens unit moves as indicated by a dotted arrow in each sectional view in FIGS. 1A, 4A, 7A, 10A, and 13A.

FIGS. 2A, 5A, 8A, 11A, and 14A are longitudinal aberration diagrams at the wide-angle end of the zoom lenses L0 according to Examples 1 to 5, respectively. FIGS. 2B, 5B, 8B, 11B, and 14B are longitudinal aberration diagrams at the telephoto end of the zoom lenses L0 of Examples 1 to 5, respectively.

In each spherical aberration diagram, FNO denotes an F-number, and amounts of spherical aberrations are drawn with respect to a d-line (wavelength 587.56 nm) and a g-line (wavelength 435.835 nm). In each astigmatism diagram, S denotes an astigmatism amount on a sagittal image plane, and M denotes an astigmatism amount on a meridional image plane. Each distortion diagram illustrates a distortion amount with respect to the d-line. Each chromatic aberration diagram illustrates a lateral chromatic aberration amount with respect to the g-line. ω denotes an image pickup half angle of view (°) acquired by paraxial calculation.

FIGS. 3A, 6A, 9A, 12A, and 15A are lateral aberration diagrams at the wide-angle end of the zoom lenses L0 according to Examples 1 to 5, respectively. FIGS. 3B, 6B, 9B, 12B, and 15B are lateral aberration diagrams at the telephoto end of the zoom lenses L0 according to Examples 1 to 5, respectively. Each figure includes aberration diagrams with respect to the d-line and the g-line at, in order from the top, an image height of 100%, an image height of 80%, an image height of 70%, an image height of 50%, and the center. A dashed line S (d) represents a sagittal image plane at the d-line, a solid line M (d) represents a meridional image plane at the d-line, and a two-dot chain line M (g) represents a meridional image plane at the g-line.

Next, a description is given of a characteristic configuration of the zoom lens L0 according to each example.

The zoom lens L0 according to each example includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. In the zoom lens L0 according to each example, each distance between adjacent lens units changes during zooming. Such a configuration facilitates a size reduction of the zoom lens L0. A similar effect can be acquired by placing one or more lens units on the image side of the fifth lens unit L5.

In the zoom lens L0 according to each example, during zooming from the wide-angle end to the telephoto end, the first lens unit L1 moves to the object side. This shortens an overall lens length at the wide-angle end, which facilitates the size reduction. During zooming from the wide-angle end to the telephoto end, a distance between the third lens unit L3 and the fourth lens unit L4 decreases, and during zooming from the wide-angle end to the telephoto end, a distance between the fourth lens unit L4 and the fifth lens unit L5 decreases. This indicates that the zoom lens L0 according to each example has a telephoto-type power arrangement at the telephoto end, which facilitates shortening the overall lens length. The number of optical elements each having a refractive power in the first lens unit L1 is two or less. This facilitates a weight reduction of the zoom lens L0.

The zoom lens L0 according to each example satisfies the following inequality (1).

$$0.50 < f1/f3 < 2.70 \tag{1}$$

f1 represents a focal length of the first lens unit L1, and f3 represents a focal length of the third lens unit L3.

The inequality (1) specifies a ratio between the focal length f1 of the first lens unit L1 and the focal length f3 of the third lens unit L3. Properly setting the focal length f1 of the first lens unit L1 relative to the focal length f3 of the third lens unit L3 can increase a ratio of an absolute value |β2wt| of a zooming sharing ratio (share of magnification variation) of the second lens unit L2 to a zooming ratio. This makes it possible to sufficiently increase the zooming ratio without an increase in the number of lenses in each lens unit. If the focal length f1 of the first lens unit L1 is so long that the value is larger than the upper limit value of the inequality (1), a ratio of the absolute value $|\beta 2wt|$ of the zooming sharing ratio of the second lens unit L2 to the zooming ratio is so small, making it difficult to provide a large zooming ratio while the weight is reduced. Furthermore, it is difficult to reduce the overall lens length at the wide-angle end. If the focal length f3 of the third lens unit L3 is so short that the value is larger than the upper limit value of the inequality (1), the number of lenses in the third lens unit L3 is increased so that an aberration fluctuation during zooming is reduced, which makes it difficult to reduce the weight of the zoom lens L0. If the focal length f1 of the first lens unit L1 is so short that the value is smaller than the lower limit value of the inequality (1), it is difficult to correct various aberrations, such as spherical aberration, occurring in the first lens unit L1. If, in order that those aberrations are corrected, the number of lenses in the first lens unit L1 is increased, it is difficult to reduce the weight of the zoom lens L0. If the focal length f3 of the third lens unit L3 is so long that the value is smaller than the lower limit value of the inequality (1), the overall lens length increases and the zoom lens L0 becomes large.

The zoom lens L0 according to each example further satisfies the following inequality (2).

$$0.18 < |M34/M45| < 0.70 \tag{2}$$

M34 is the changing amount in the distance (hereinafter also referred to as "distance changing amount") between the third lens unit L3 and the fourth lens unit L4 in zooming from the wide-angle end to the telephoto end. M45 is the changing amount in the distance between the fourth lens unit L4 and the fifth lens unit L5 in zooming from the wide-angle end to the telephoto end. M34 and M45 are quantities defined by the following equalities where M3, M4, and M5 respectively represent moving amounts of the third lens unit L3, the fourth lens unit L4, and the fifth lens unit L5 in zooming from the wide-angle end to the telephoto end.

$$M34 = M4 - M3$$

$$M45 = M5 - M4$$

Starting points of the moving amounts M3, M4, and M5 are positions at the wide-angle end of surface vertexes closest to the object in the third lens unit L3, the fourth lens unit L4, and the fifth lens unit L5, respectively. The sign of each of the moving amounts M3, M4, and M5 is negative when the lens unit is on the object side of the starting point.

The inequality (2) specifies an absolute value of a ratio between the changing amount M34 in the distance between the third lens unit L3 and the fourth lens unit L4 and the changing amount M45 in the distance between the fourth lens unit L4 and the fifth lens unit L5. When the distance changing amount M34 relative to the distance changing amount M45 is properly set, an aberration fluctuation during zooming is easily reduced while the number of lenses in the third lens unit L3 is reduced. If the absolute value of the changing amount M34 in the distance between the third lens unit L3 and the fourth lens unit L4 is so large that the value is larger than the upper limit value of the inequality (2), an aberration fluctuation during zooming is large. If the changing amount M45 in the distance between the fourth lens unit L4 and the fifth lens unit L5 is so small that the value is larger than the upper limit value of the inequality (2), it is difficult to acquire a desired zooming ratio, and therefore the refractive power is to be strengthened by increasing the number of lenses in the fourth lens unit L4 and the fifth lens unit L5. This makes it difficult to reduce the weight of the zoom lens L0. If the absolute value of the changing amount M34 in the distance between the third lens unit L3 and fourth lens unit L4 is so small that the value is smaller than the lower limit value of the inequality (2), it is difficult for the change in the distance between the third lens unit L3 and the fourth lens unit L4 to correct an aberration fluctuation occurring during zooming. If the changing amount M45 in the distance between the fourth lens unit L4 and the fifth lens unit L5 is so large that the value is smaller than the lower limit value of the inequality (2), the position at the wide-angle end of the fifth lens unit L5 is too far from the aperture diaphragm SP. This increases an effective diameter of the fifth lens unit L5, making it difficult to reduce the weight of the zoom lens L0.

The numerical ranges of the inequalities (1) and (2) may be numerical ranges of the following inequalities (1a) and (2a).

$$0.80 < f1/f3 < 2.65 \tag{1a}$$

$$0.19 < |M34/M45| < 0.68 \tag{2a}$$

The numerical ranges of the inequalities (1) and (2) may be numerical ranges of the following inequalities (1b) and (2b).

$$0.90 < f1/f3 < 2.60 \tag{1b}$$

$$0.20 < |M34/M45| < 0.67 \tag{2b}$$

By the above-described configurations, it is possible to realize a small and light zoom lens having high optical performance over an entire zoom range and a large zooming ratio.

Next, a description is given of configurations that may be satisfied in the zoom lens L0 according to each example.

An optical element having a positive refractive power may be disposed on a position closest to the image plane of the first lens unit L1. This makes it easy to reduce the size and weight of the zoom lens L0 and realize a zoom lens in which chromatic aberration and other aberrations are corrected well.

An aperture diaphragm SP may be disposed between the second lens unit L2 and the third lens unit L3. Thereby, it is possible to reduce an effective diameter of a lens unit disposed on the image side of the aperture diaphragm SP, facilitating a weight reduction of the zoom lens L0.

During zooming from the wide-angle end to the telephoto end, the second lens unit L2 may not move relatively to the image plane IP. This makes a mechanism for holding the second lens unit L2 simple, which facilitates a size reduction of the second lens unit L2 and the zoom lens L0.

The number of lenses in the third lens unit L3 or the fourth lens unit L4 may be two or less. This makes it possible to reduce the weight of the third lens unit L3 or the fourth lens unit L4, facilitating a weight reduction of the zoom lens L0.

At least one lens surface among lens surfaces in the third lens unit L3 and the fourth lens unit L4 may be an aspherical surface. This makes it possible to reduce the number of lenses in the third lens unit L3 or the fourth lens unit L4, reducing an aberration fluctuation during zooming while reducing the weight of the zoom lens L0.

During focusing from an object at an infinite distance to an object at a closest distance, the fifth lens unit L5 may move. That is, focusing from an object at an infinite distance to an object at a close distance may be performed by the fifth lens unit L5. An effective diameter of a light beam is likely to be small in a lens unit on the image side of the aperture diaphragm SP. Thus, if a lens unit on the image side of the aperture diaphragm SP is used as the focus lens unit, a holding mechanism and a driving mechanism thereof can be made simple, and a lens effective diameter of the entire system can be reduced, which facilitates a weight reduction of the zoom lens L0. In addition, a zooming effect is relatively small on the image side of the aperture diaphragm SP, and therefore an image magnification variation can be reduced during focusing from an object at an infinite distance to an object at a closest distance. In this respect, so-called breathing, which is a variation in the angle of view when the focus lens unit moves from an object at an infinite distance to an object at a closest distance, can be reduced, making the zoom lens L0 suitable for motion image capturing. In particular, by using the fifth lens unit L5 as the focus lens unit, a focus sensitivity can be increased well and the moving amount of the fifth lens unit L5 during focusing can be reduced, facilitating a size reduction of the zoom lens L0.

Driving an entire or a part of any lens unit in a direction including a component of a direction orthogonal to an optical axis can provide an effect of reducing deterioration in image quality caused by image blur (shake). In particular, the second lens unit L2 may be driven in the direction including a component of a direction orthogonal to the optical axis in image stabilization. Using the second lens unit L2 as an image stabilization lens unit can reduce a moving amount of a lens unit during image stabilization while simplifying an image stabilization mechanism, facilitating a size reduction of the zoom lens L0. The second lens unit L2 performs image stabilization by moving in the direction including a component of a direction orthogonal to the optical axis, and therefore the same effect can be acquired in a case where image stabilization is performed by a movement in a direction including a rotation component about a certain point, that is, a case where image stabilization is performed by rotation.

A description is given of a condition that the zoom lens L0 according to each example may satisfy. The zoom lens L0 according to each example may satisfy one or more of the following inequalities (3) to (9).

$$0.50 < TTLt/ft < 1.00 \tag{3}$$

$$0.90 < |\beta2wt/\beta Rwt| < 10.00 \tag{4}$$

$$2.0 < |M1/M3| < 4.0 \tag{5}$$

$$0.3 < f1/ft < 0.7 \tag{6}$$

$$0.18 < f3/ft < 0.70 \tag{7}$$

$$0.10 < f4/ft < 0.30 \tag{8}$$

$$-0.22 < f5/ft < -0.10 \tag{9}$$

TTLt represents a distance on the optical axis from a surface closest to the object of the zoom lens L0 at the telephoto end to the image plane IP (overall lens length). ft represents a focal length at the telephoto end of the zoom lens L0. $\beta2wt$ represents the zooming sharing ratio of the second lens unit L2 in zooming from the wide-angle end to the telephoto end. $\beta Rwt$ represents a zooming sharing ratio of a combined lens unit from the fourth lens unit L4 to a lens unit disposed on a position closest to the image plane in zooming from the wide-angle end to the telephoto end. M1 represents a moving amount of the first lens unit L1 in zooming from the wide-angle end to the telephoto end. M3 represents the moving amount of the third lens unit L3 in zooming from the wide-angle end to the telephoto end. f4 represents a focal length of the fourth lens unit L4. f5 represents a focal length of the fifth lens unit L5.

The starting point of the moving amount M1 is a position at the wide-angle end of a surface vertex closest to the object in the first lens unit L1. The sign of the moving amount M1 is negative when the first lens unit is located on the object side of the starting point. The starting point of the moving amount M3 is a position at the wide-angle end of a surface vertex closest to the object in the third lens unit L3, and the sign of the moving amount M3 is negative when the third lens unit L3 is on the object side of the starting point. The zooming sharing ratios $\beta2wt$ and $\beta Rwt$ are quantities defined as follows.

$$\beta2wt = \beta2t/\beta2w$$

$$\beta Rwt = \beta Rt/\beta Rw$$

$\beta2w$ represents the lateral magnification at the wide-angle end of the second lens unit L2. $\beta2t$ represents a lateral magnification at the telephoto end of the second lens unit L2. $\beta Rw$ represents a combined lateral magnification at the wide-angle end of the combined lens unit of lens units from the fourth lens unit to a lens unit closest to the image plane. $\beta Rt$ represents a combined lateral magnification at the telephoto end of the combined lens unit of the lens units from the fourth lens unit to the lens unit located closest to the image side.

The combined lateral magnification $\beta Rw$ is an amount expressed by an infinite product of lateral magnifications at the wide-angle end of all the lens units from the fourth lens unit L4 to the lens unit closest to the image side, and the combined lateral magnification $\beta Rt$ is an amount expressed by an infinite product of lateral magnifications at the telephoto end of all the lens units from the fourth lens unit L4 to the lens unit closest to the image side.

The inequality (3) specifies a ratio between the distance TTLt on the optical axis from the surface closest to the object side in the zoom lens L0 at the telephoto end to the image plane IP and the focal length ft at the telephoto end of the zoom lens L0. Properly setting the distance TTLt facilitates reductions in the size and the weight of the zoom lens L0. If the value of the distance TTLt is so small relatively to the focal length ft of the zoom lens L0 that the value is smaller than the lower limit value of the inequality (3), the refractive power of each lens unit in the zoom lens L0 is too strong. In this case, the number of lenses in each lens unit is to be increased so that the aberration occurring in each lens unit is corrected, which makes it difficult to reduce the weight of the zoom lens L0. If the value of the distance TTLt is so large relatively to the focal length ft that the value is larger than the upper limit value of the inequality (3), a diameter at the telephoto end of the first lens unit L1 is large, which makes it difficult to reduce the weight of the zoom lens L0. In addition, the overall lens length at the wide-angle end of the zoom lens L0 becomes long.

The inequality (4) specifies an absolute value of a ratio between the zooming sharing ratio $\beta2wt$ of the second lens unit L2 and the zooming sharing ratio $\beta Rwt$ of the combined lens unit from the fourth lens unit L4 to the lens unit closest to the image plane. Properly setting the value of the zooming sharing ratio $\beta2wt$ relative to the zooming sharing ratio $\beta Rwt$ makes it easy to realize both a large zooming ratio and a short overall length. If the absolute value of the zooming sharing ratio $\beta2wt$ is so small relatively to the absolute value of the zooming sharing ratio $\beta Rwt$ that the value is smaller than the lower limit value of the inequality (4), the zooming ratio is increased that assigned to the fourth lens unit L4 or lens units on the image side of the fourth lens unit L4 whose moving amounts are small during zooming. Therefore, in order that a large zooming ratio is acquired, the refractive powers of the fourth lens unit L4 or the lens units on the object side of the fourth lens unit L4 are to be increased. As a result, the number of lenses in the fourth lens unit L4 or the lens units on the image side of the fourth lens unit L4 increases, making it difficult to reduce the weight of the zoom lens L0. If the absolute value of the zooming sharing ratio β2wt is so large relatively to the absolute value of the zooming sharing ratio βRwt that the value is larger than the upper limit value of the inequality (4), the refractive power of the first lens unit L1 is so large that the number of lenses in the first lens unit L1 increases. As a result, it becomes difficult to reduce the weight of the zoom lens L0.

The inequality (5) specifies that an absolute value of a ratio between the moving amount M1 of the first lens unit L1 and the moving amount M3 of the third lens unit L3 during zooming from the wide-angle end to the telephoto end. Properly setting the value of the moving amount M1 relative to the moving amount M3 makes it easy to reduce the size and weight of the zoom lens L0 while acquiring a large zooming ratio. If the absolute value of the moving amount M1 of the first lens unit L1 is so small that the value is smaller than the lower limit value of the inequality (5), the overall lens length at the wide-angle end is long, which makes it difficult to reduce the size of the zoom lens L0. If the absolute value of the moving amount M3 of the third lens unit L3 is so large that the value is smaller than the lower limit value of the inequality (5), the aberration fluctuation during zooming increases, and in order that the aberration fluctuation is corrected, the number of lenses in the third lens unit L3 increases. As a result, it becomes difficult to reduce the weight of the zoom lens L0. If the absolute value of the moving amount M1 of the first lens unit L1 is so large that the value is larger than the upper limit value of the inequality (5), an aberration fluctuation during zooming increases. In order that the aberration fluctuation is reduced, the number of lenses in the first lens unit L1 is to be increased, which makes it difficult to reduce the weight of the zoom lens L0. If the absolute value of the moving amount M3 of the third lens unit L3 is so small that the value is larger than the upper limit value of the inequality (5), it is difficult to acquire a sufficient zooming ratio.

The inequality (6) specifies a ratio between the focal length f1 of the first lens unit L1 and the focal length ft at the telephoto end of the zoom lens L0. Properly setting the focal length f1 of the first lens unit L1 relative to the focal length ft at the telephoto end makes it easy to shorten the overall length of the zoom lens L0 while high optical performance is maintained. If the focal length f1 of the first lens unit L1 is so short relatively to the focal length ft at the telephoto end that the value is smaller than the lower limit value of the inequality (6), the number of lenses in the first lens unit L1 increases so that various aberrations such as spherical aberration is corrected. This makes it difficult to reduce the weight of the zoom lens L0. If the focal length f1 of the first lens unit L1 is so long that the value is larger than the upper limit value of the inequality (6), the overall lens length is lengthened, which makes it difficult to reduce the size of the zoom lens L0.

The inequality (7) specifies a ratio between the focal length f3 of the third lens unit L3 and the focal length ft at the telephoto end of the zoom lens L0. Properly setting the focal length f3 of the third lens unit L3 relative to the focal length ft at the telephoto end makes it easy to realize both a reduction in the number of lenses and a large zooming ratio. If the focal length f3 of the third lens unit L3 is so short relatively to the focal length ft at the telephoto end that the value is smaller than the lower limit value of the inequality (7), the number of lenses in the third lens unit L3 is increased so that fluctuations of various aberrations, such as coma, during zooming is reduced. This makes it difficult to reduce the weight of the zoom lens L0. If the focal length f3 of the third lens unit L3 is so long that the value is larger than the upper limit value of the inequality (7), acquisition of a desired zooming ratio is difficult.

The inequality (8) specifies a ratio between the focal length f4 of the fourth lens unit L4 and the focal length ft at the telephoto end of the zoom lens L0. Properly setting the focal length f4 of the fourth lens unit L4 relative to the focal length ft at the telephoto end makes it easy to realize both a reduction in the number of lenses and a large zooming ratio. If the focal length f4 of the fourth lens unit L4 is so short relatively to the focal length ft at the telephoto end that the value is smaller than the lower limit value of the inequality (8), the number of lenses in the fourth lens unit L4 increases so that fluctuations of various aberrations, such as coma, during zooming is reduced. This makes it difficult to reduce the weight of the zoom lens L0. If the focal length f4 of the fourth lens unit L4 is so long that the value is larger than the upper limit value of the inequality (8), it is difficult to acquire a desired zooming ratio.

The inequality (9) specifies a ratio between the focal length f5 of the fifth lens unit L5 and the focal length ft at the telephoto end of the zoom lens L0. Properly setting the focal length f5 of the fifth lens unit L5 relative to the focal length ft at the telephoto end makes it easy to realize both a reduction in the number of lenses and a large zooming ratio. In addition, if the zoom lens L0 satisfies the inequality (9), in a case where the fifth lens unit L5 is used for focusing from an object at an infinite distance to an object at a closest distance, it is easy to realize both a reduction in the weight of the focus lens unit and good focusing sensitivity. If the focal length f5 of the fifth lens unit L5 is so short relatively to the focal length ft at the telephoto end that the value is smaller than the lower limit value of the inequality (9), the number of lenses in the fifth lens unit L5 is increased so that fluctuations of various aberrations, such as field curvature, during zooming is reduced. This makes it difficult to reduce the weight of the zoom lens L0. If the value is smaller than the lower limit value of the inequality (9), in a case where the fifth lens unit L5 is used as the focus lens unit, the focus sensitivity is too high, and therefore control of the focus lens unit using an actuator becomes difficult. If the focal length f5 of the fifth lens unit L5 is so long that the value is larger than the upper limit value of the inequality (9), it is difficult to acquire a desired zooming ratio. Moreover, if the upper limit value of the inequality (9) is exceeded, in a case where the fifth lens unit is used as the focus lens unit, a moving amount of the focus lens unit during focusing is too large, making it difficult to reduce the size of the zoom lens L0.

The numerical ranges of the inequalities (3) to (9) may be numerical ranges of the following inequalities (3a) to (9a).

$$0.70 < TTLt/ft < 0.80 \tag{3a}$$

$$0.92 < |\beta2wt/\beta Rwt| < 9.00 \tag{4a}$$

$$2.1 < |M1/M3| < 3.8 \tag{5a}$$

$$0.4 < f1/ft < 0.6 \tag{6a}$$

$$0.20 < f3/ft < 0.60 \tag{7a}$$

$$0.11 < f4/ft < 0.25 \tag{8a}$$

$$-0.20 < f5/ft < -0.11 \tag{9a}$$

The numerical ranges of the inequalities (3) to (9) may be numerical ranges of the following inequalities (3b) to (9b).

$$0.74 < TTLt/ft < 0.77 \tag{3b}$$

$$0.93 < |\beta2wt/\beta Rwt| < 8.40 \tag{4b}$$

$$2.2 < |M1/M3| < 3.5 \tag{5b}$$

$$0.50 < f1/ft < 0.58 \tag{6b}$$

$$0.22 < f3/ft < 0.52 \tag{7b}$$

$$0.12 < f4/ft < 0.21 \tag{8b}$$

$$-0.19 < f5/ft < -0.12 \tag{9b}$$

Next, a detailed description is given of the zoom lens L0 according to each example.

A description is given of a lens configuration of the zoom lenses L0 according to Examples 1 to 3. FIGS. 1A and 1B, FIGS. 4A and 4B, and FIGS. 7A and 7B illustrate lens sections of the zoom lenses L0 according to Examples 1 to 3, respectively. The zoom lens L0 according to each of Examples 1 to 3 includes first through fifth lens units. L1 denotes the first lens unit having a positive refractive power, L2 denotes the second lens unit having a negative refractive power, L3 denotes the third lens unit having a positive refractive power, L4 denotes the fourth lens unit having a positive refractive power, and L5 denotes the fifth lens unit having a negative refractive power. By moving toward the image side, the fifth lens unit L5 can perform focusing from an object at an infinite distance to an object at a closest distance. By driving in a direction including a component of a direction orthogonal to an optical axis, the second lens unit L2 can provide an effect of reducing deterioration in image quality caused by image blur (shake).

Figures 10A, 10B:
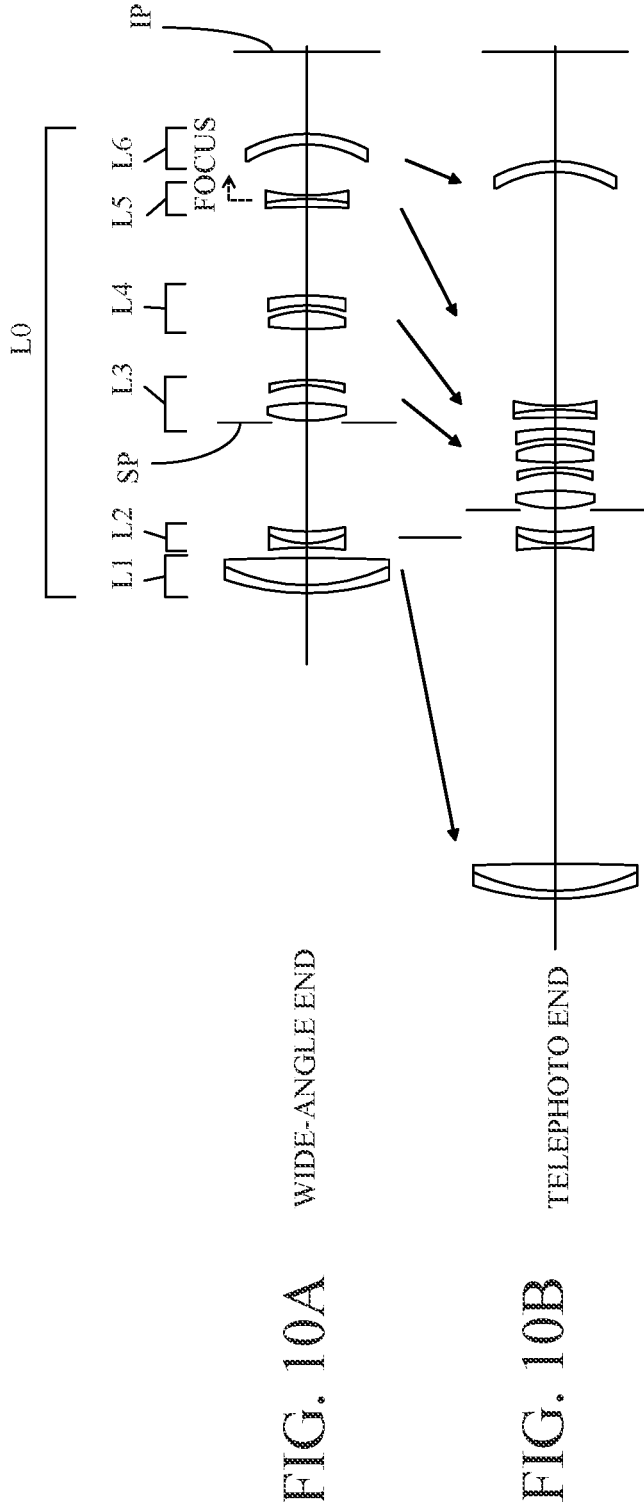
FIGS. 10A and 10B are sectional views of a zoom lens at a wide-angle end (FIG. 10A) and a telephoto end (FIG. 10B) according to Example 4.
Figure 11A:
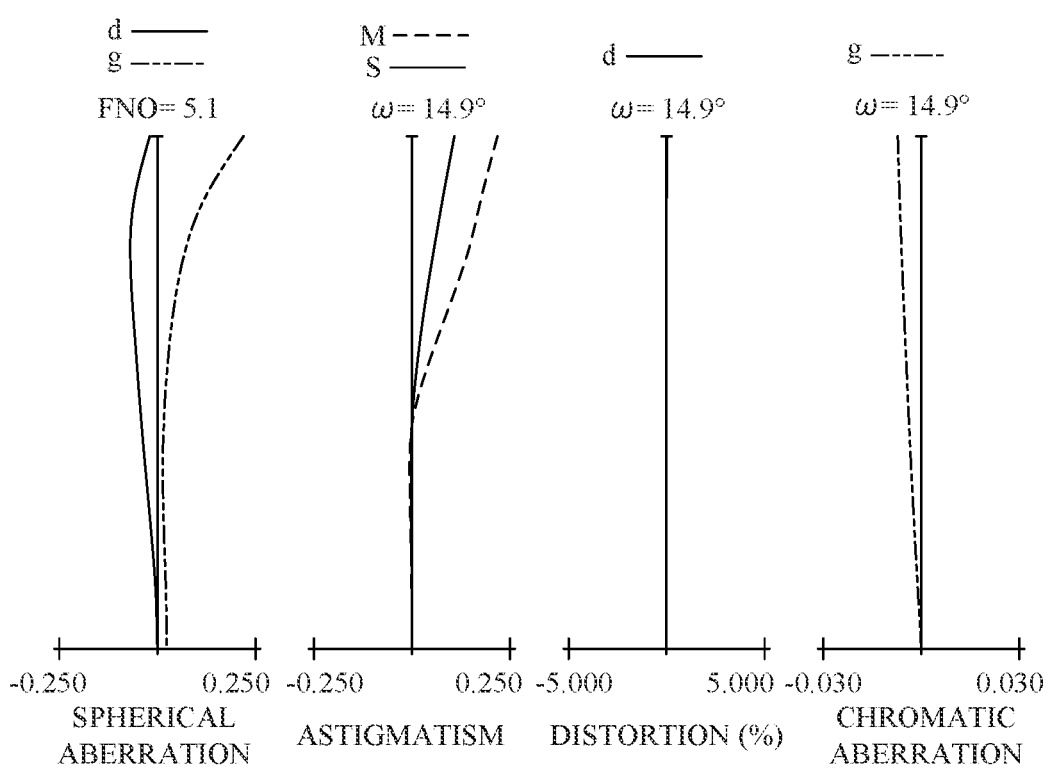
FIGS. 11A and 11B are longitudinal aberration diagrams of the zoom lens at the wide-angle end (FIG. 11A) and a telephoto end (FIG. 11B) according to Example 4.
Figure 11B:
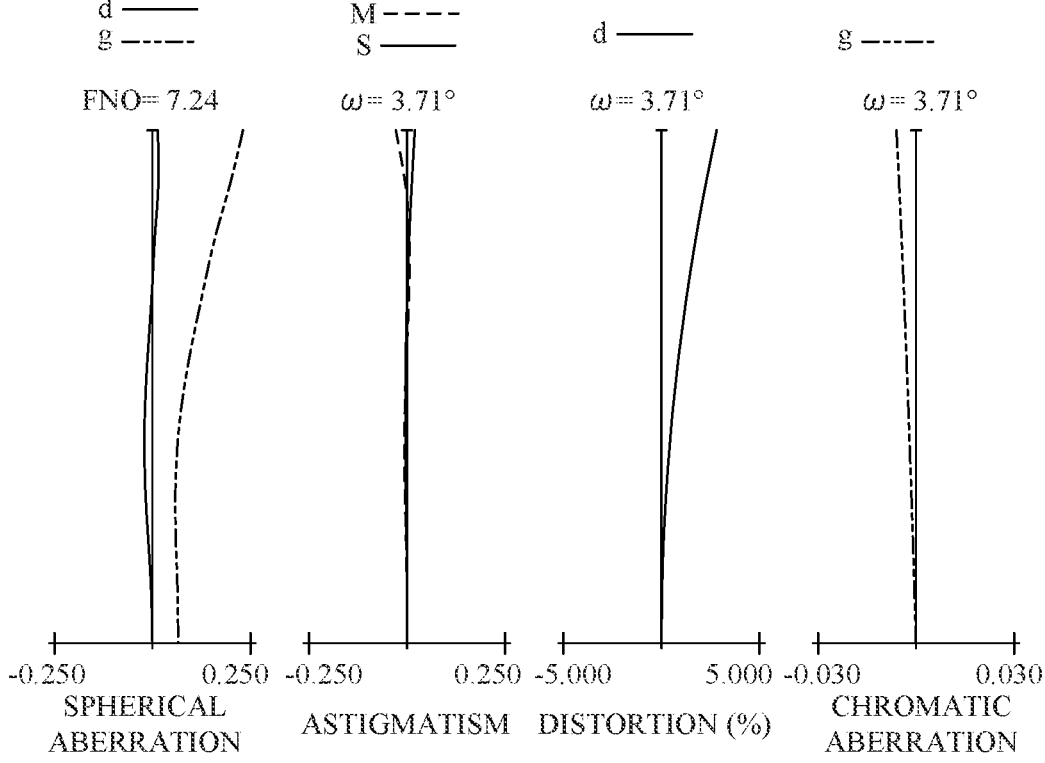
Figure 12A:
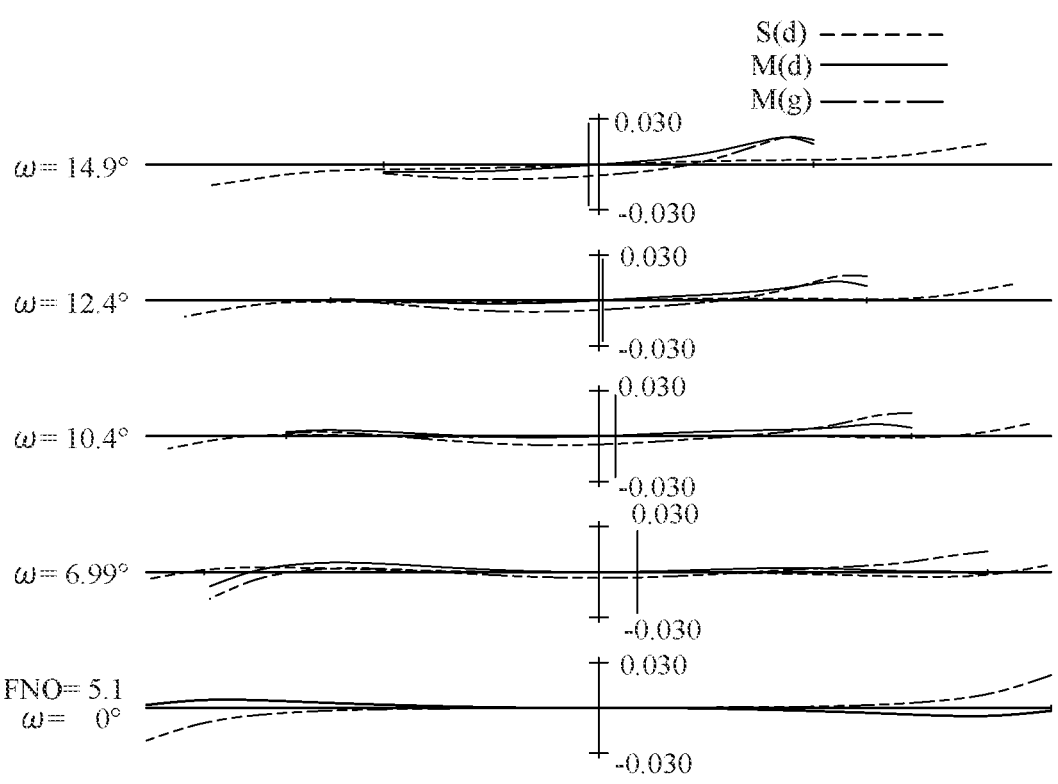
FIGS. 12A and 12B are lateral aberration diagrams of the zoom lens at the wide-angle end (FIG. 12A) and the telephoto end (FIG. 12B) according to Example 4.
Figure 12B:
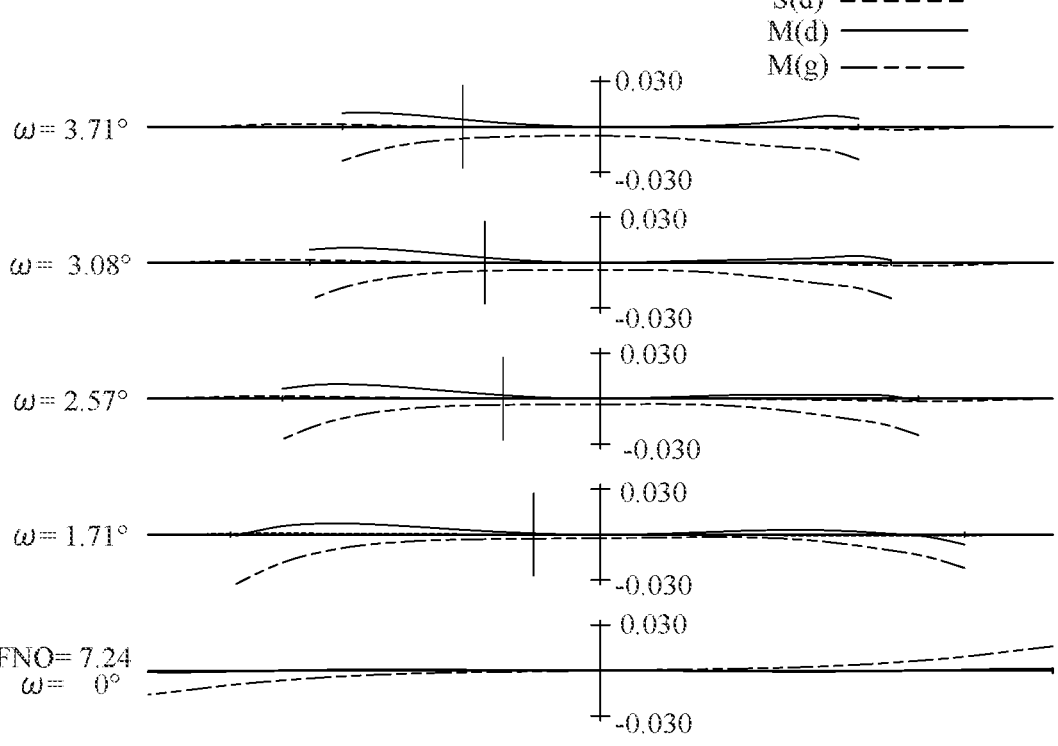

A description is given of a lens configuration of the zoom lens L0 according to Example 4. FIGS. 10A and 10B illustrate lens sections of the zoom lens L0 according to Example 4. The zoom lens L0 according to Example 4 includes first through sixth lens units. L1 denotes the first lens unit having a positive refractive power, L2 denotes the second lens unit having a negative refractive power, L3 denotes the third lens unit having a positive refractive power, L4 denotes the fourth lens unit having a positive refractive power, L5 denotes the fifth lens unit having a negative refractive power, and L6 denotes a sixth lens unit having a negative refractive power. By moving toward the image side, the fifth lens unit L5 can perform focusing from an object at an infinite distance to an object at a closest distance. By driving in a direction including a component of a direction orthogonal to an optical axis, the second lens unit L2 can provide an effect of reducing deterioration in image quality caused by image blur (shake).

Figures 13A, 13B:
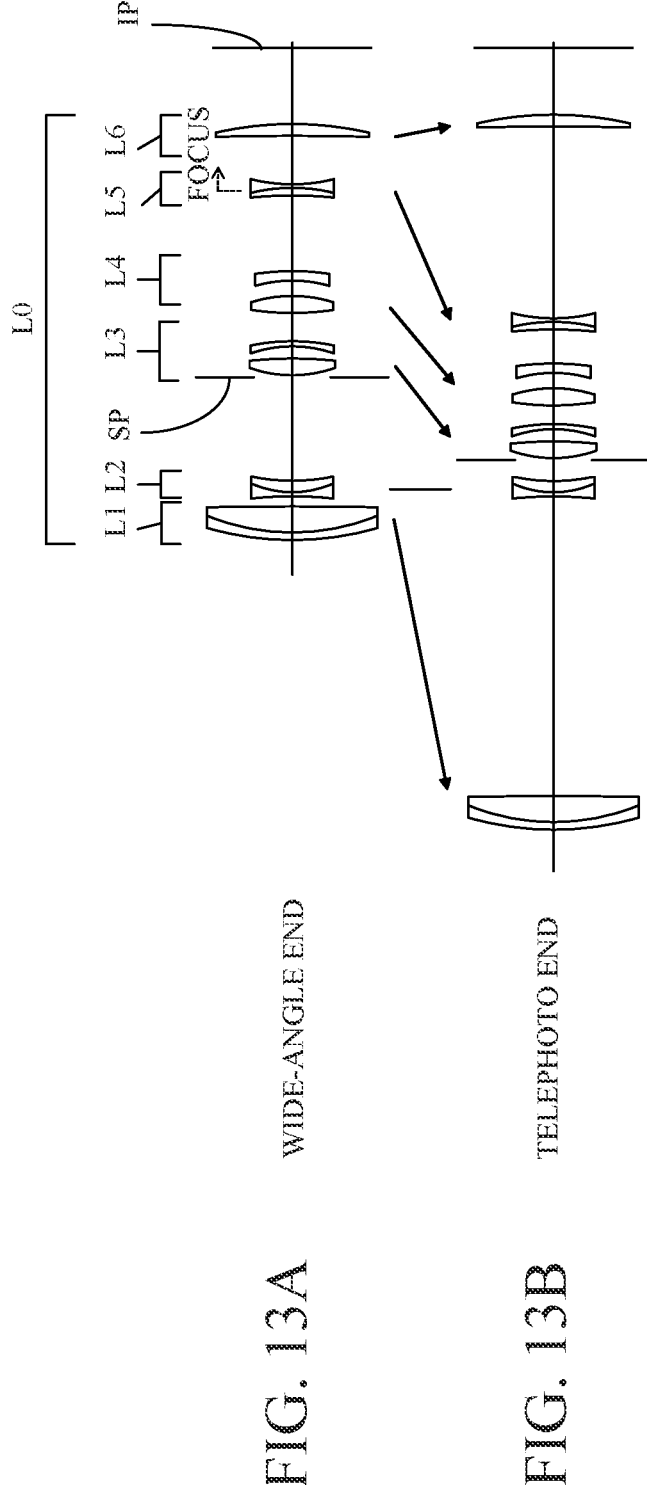
FIGS. 13A and 13B are sectional views of a zoom lens at a wide-angle end (FIG. 13A) and a telephoto end (FIG. 13B) according to Example 5.
Figure 14A:
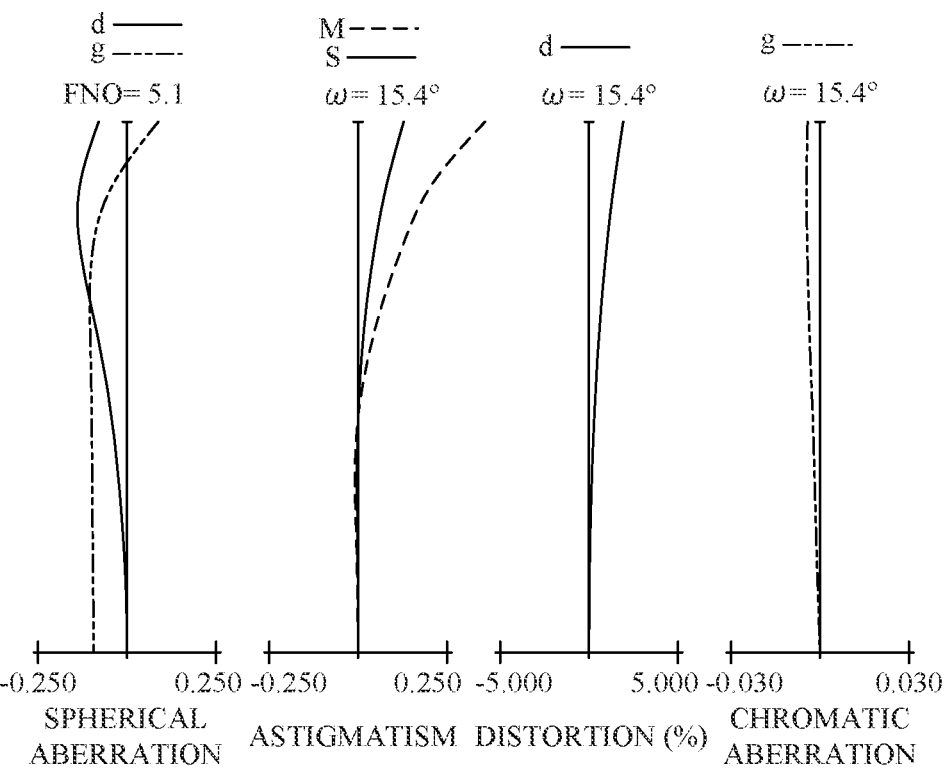
FIGS. 14A and 14B are longitudinal aberration diagrams of the zoom lens at the wide-angle end (FIG. 14A) and a telephoto end (FIG. 14B) according to Example 5.
Figure 14B:
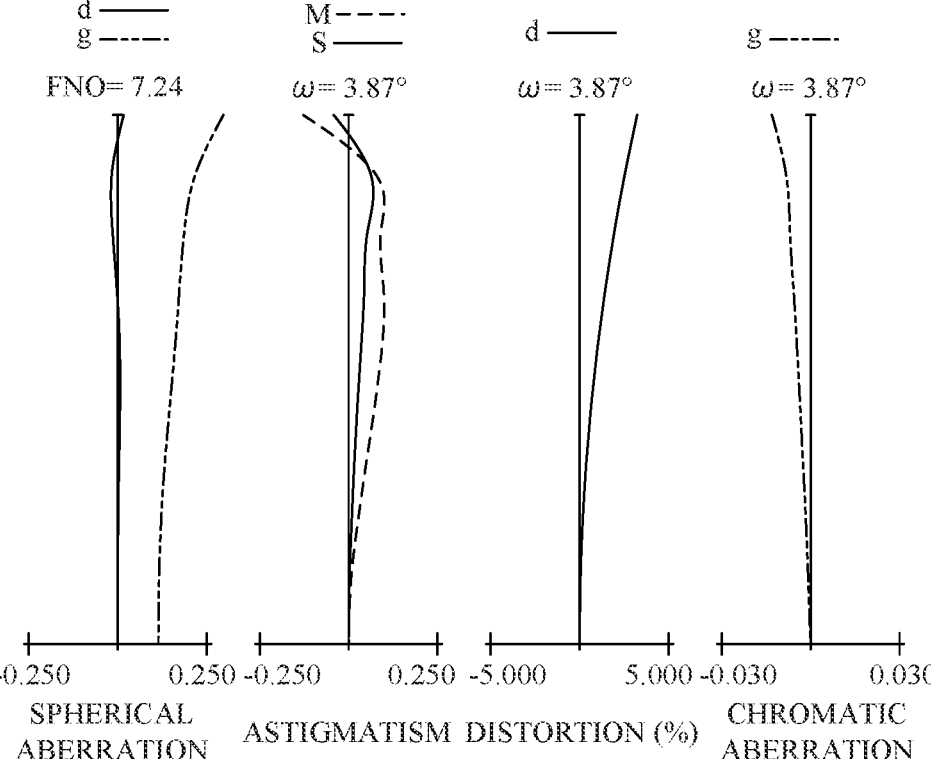
Figure 15A:
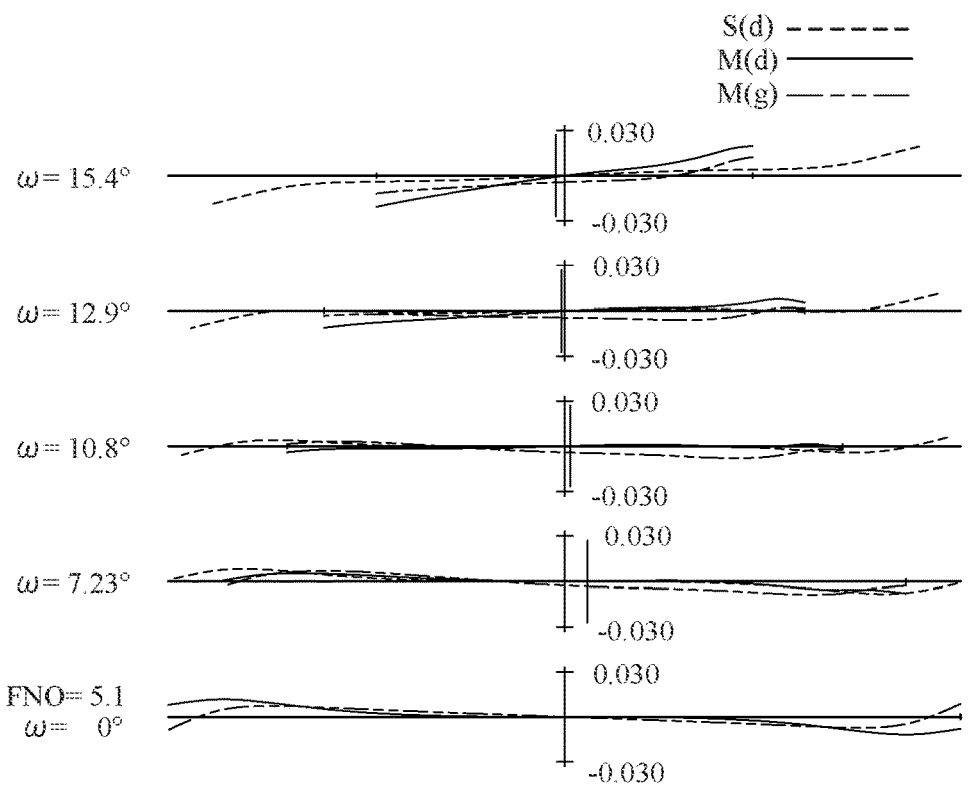
FIGS. 15A and 15B are lateral aberration diagrams of the zoom lens at the wide-angle end (FIG. 15A) and the telephoto end (FIG. 15B) according to Example 5.
Figure 15B:
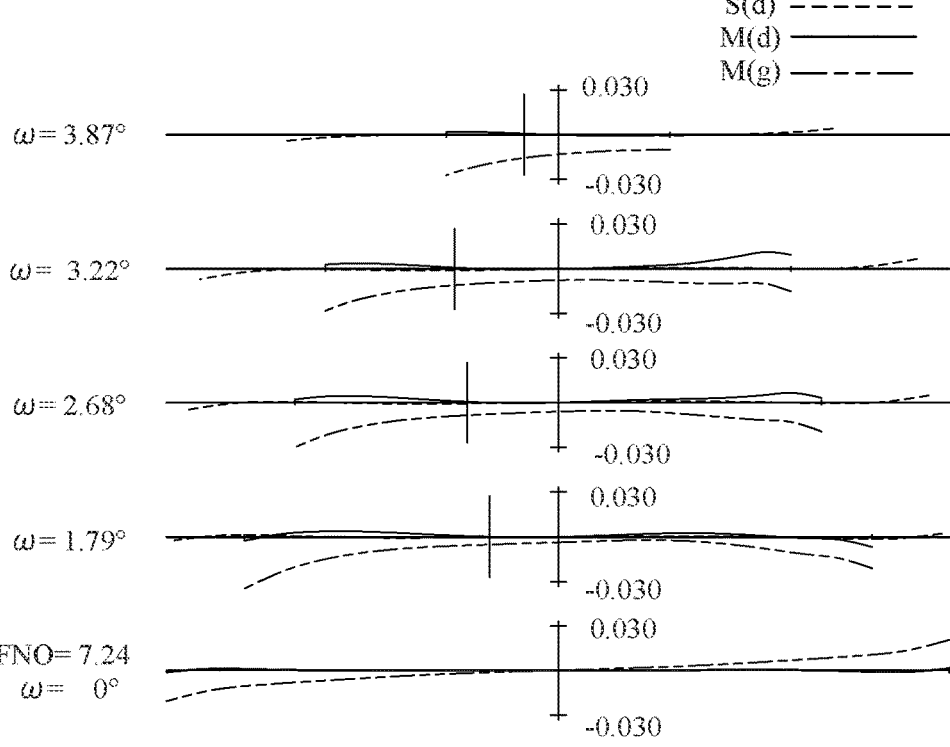

A description is given of a lens configuration of the zoom lens L0 according to Example 5. FIGS. 13A and 13B illustrate lens sections of the zoom lens L0 according to Example 5. The zoom lens L0 according to Example 5 includes first through sixth lens units. L1 denotes the first lens unit having a positive refractive power, L2 denotes the second lens unit having a negative refractive power, L3 denotes the third lens unit having a positive refractive power, L4 denotes the fourth lens unit having a positive refractive power, L5 denotes the fifth lens unit having a negative refractive power, and L6 denotes a sixth lens unit having a positive refractive power. By moving toward the image side, the fifth lens unit L5 can perform focusing from an object at an infinite distance to an object at a closest distance. By driving in a direction including a component of a direction orthogonal to an optical axis, the second lens unit L2 can provide an effect of reducing deterioration in image quality caused by image blur (shake).

Numerical Examples 1 through 5 corresponding to Examples 1 through 5, respectively, are provided below.

In surface data of each numerical example, r (mm) represents a radius of curvature of each optical surface, and d (mm) represents an on-axis distance (distance on the optical axis) from an m-th surface to an (m+1)-th surface. m is a surface number counted from a light entering side. nd represents a refractive index with respect to the d-line of each optical member, and vd represents an Abbe number of the optical member. The Abbe number vd of a certain material is expressed by the following equation where Nd, NF, and NC represent refractive indexes with respect to the d-line (587.56 nm), an F-line (486.13 nm), and a C-line (656.27 nm) of the Fraunhofer lines.

$$vd=(Nd-1)/(NF-NC)$$

In each numerical example, all of d (mm), a focal length (mm), an F-number, a half angle of view (°), which is acquired by paraxial calculation, are values acquired in a state where the zoom lens L0 according to each example focuses on an object at an infinite distance. A back focus BF is a distance on an optical axis from a final lens surface (lens surface closest to an image plane) to a paraxial image plane expressed in an air conversion length. An overall lens length is a length acquired by adding a back focus to a distance on an optical axis from a first lens surface (lens surface closest to an object) to a final lens surface. A lens unit is not limited to a lens unit including a plurality of lenses and may consist of a single lens.

In a case where an optical surface is an aspherical surface, a symbol * is attached to a right side of the surface number. A shape of an aspherical surface is expressed by the following equation where X represents an amount of displacement in the optical axis direction from a surface vertex, h represents a height from the optical axis in a direction orthogonal to the optical axis, R represents a paraxial radius of curvature, K represents a conic constant, and A4, A6, A8, A10, and A12 represent aspherical surface coefficients of respective orders.

$$x=(h^2/R)/[1+\{1-(1\pm K)(h/R)^2\}^{1/2}]+A4\times h^4\pm A6\times h^6+A8\times h^8+A10\times h^{10}+A12\times h^{12}$$

"e±XX" in each aspherical surface coefficient represents "$\times 10^{\pm XX}$".

Numerical Example 1

Unit mm
SURFACE DATA

| Surface Number | r | d | nd | vd |
| --- | --- | --- | --- | --- |
| 1 | 45.825 | 1.50 | 1.91082 | 35.2 |
| 2 | 33.201 | 5.15 | 1.49700 | 81.5 |
| 3 | −334.892 | (Variable) | | |
| 4 | −49.993 | 0.80 | 1.77250 | 49.6 |
| 5 | 14.423 | 2.23 | 2.05090 | 26.9 |
| 6 | 27.415 | (Variable) | | |
| 7 (Diaphragm) | ∞ | 0.38 | | |
| 8 | 20.369 | 3.30 | 1.48749 | 70.2 |
| 9 | −47.315 | 4.76 | | |
| 10 | −17.892 | 1.00 | 1.84666 | 23.9 |
| 11 | −33.732 | (Variable) | | |
| 12 | 32.322 | 3.39 | 1.49700 | 81.5 |

-continued

| | | | | |
|---|---|---|---|---|
| 13 | −19.312 | 0.82 | | |
| 14 | −26.496 | 1.90 | 1.53110 | 55.9 |
| 15* | −34.445 | (Variable) | | |
| 16 | −218.570 | 1.50 | 1.89286 | 20.4 |
| 17 | −34.943 | 0.70 | 1.77250 | 49.6 |
| 18 | 23.223 | (Variable) | | |
| Image Plane | ∞ | | | |

ASPHERICAL SURFACE DATA
15th Surface

K = 0.00000e+00 A4 = 5.54876e−05 A6 = 1.06102e−07
A8 = −1.28230e−09 A10 = 2.87863e−11 A12 = −3.23250e−14

VARIOUS DATA

Zoom Ratio 3.64

| | Wide Angle | Middle | Telephoto |
|---|---|---|---|
| Focal Length: | 55.72 | 131.14 | 202.99 |
| F-NUMBER: | 5.19 | 6.53 | 7.28 |
| Half Angle of View (°): | 13.77 | 5.95 | 3.85 |
| Image Height: | 13.66 | 13.66 | 13.66 |
| Overall Lens Length: | 110.95 | 140.56 | 154.01 |
| BF: | 33.31 | 50.77 | 60.84 |
| d3 | 14.77 | 44.38 | 57.83 |
| d6 | 21.16 | 10.97 | 4.47 |
| d11 | 4.61 | 1.01 | 1.00 |
| d15 | 9.68 | 6.01 | 2.44 |
| d18 | 33.31 | 50.77 | 60.84 |

ZOOM LENS UNIT DATA

| Unit | Starting Surface | Focal Length |
|---|---|---|
| 1 | 1 | 110.76 |
| 2 | 4 | −29.03 |
| 3 | 7 | 61.52 |
| 4 | 12 | 28.18 |
| 5 | 16 | −29.40 |

Numerical Example 2

Unit mm
SURFACE DATA

| Surface Number | r | d | nd | vd |
|---|---|---|---|---|
| 1 | 45.531 | 1.50 | 1.91082 | 35.2 |
| 2 | 33.042 | 5.15 | 1.49700 | 81.5 |
| 3 | −301.422 | (Variable) | | |
| 4 | −53.807 | 0.80 | 1.77250 | 49.6 |
| 5 | 15.485 | 2.23 | 2.05090 | 26.9 |
| 6 | 28.905 | (Variable) | | |
| 7 (Diaphragm) | ∞ | 0.38 | | |
| 8 | 21.214 | 3.30 | 1.48749 | 70.2 |
| 9 | −217.922 | 6.03 | | |
| 10 | −19.999 | 1.00 | 1.84666 | 23.9 |
| 11 | −37.377 | (Variable) | | |
| 12 | 24.246 | 3.39 | 1.49700 | 81.5 |
| 13 | −24.401 | 2.49 | | |
| 14 | −39.700 | 1.90 | 1.53110 | 55.9 |
| 15* | −45.150 | (Variable) | | |
| 16 | −642.141 | 1.50 | 1.89286 | 20.4 |
| 17 | −40.848 | 0.70 | 1.77250 | 49.6 |
| 18 | 22.945 | (Variable) | | |
| Image Plane | ∞ | | | |

-continued

ASPHERICAL SURFACE DATA
15th Surface

K = 0.00000e+00 A4 = 6.52836e−05 A6 = 1.80332e−07
A8 = −2.40292e−09 A10 = 3.90789e−11 A12 = −1.26282e−13

VARIOUS DATA

Zoom Ratio 3.66

| | Wide Angle | Middle | Telephoto |
|---|---|---|---|
| Focal Length: | 55.70 | 89.31 | 203.70 |
| F-NUMBER: | 5.10 | 6.05 | 7.24 |
| Half Angle of View (°): | 13.78 | 8.70 | 3.84 |
| Image Height: | 13.66 | 13.66 | 13.66 |
| Overall Lens Length: | 112.15 | 126.46 | 152.60 |
| BF: | 29.61 | 39.68 | 58.93 |
| d3 | 16.02 | 30.32 | 56.47 |
| d6 | 22.16 | 16.10 | 4.12 |
| d11 | 2.91 | 1.02 | 1.00 |
| d15 | 11.09 | 8.97 | 1.73 |
| d18 | 29.61 | 39.68 | 58.93 |

ZOOM LENS UNIT DATA

| Unit | Starting Surface | Focal Length |
|---|---|---|
| 1 | 1 | 108.03 |
| 2 | 4 | −30.57 |
| 3 | 7 | 105.18 |
| 4 | 12 | 26.23 |
| 5 | 16 | −31.13 |

Numerical Example 3

Unit mm
SURFACE DATA

| Surface Number | r | d | nd | vd |
|---|---|---|---|---|
| 1 | 43.690 | 1.50 | 1.91082 | 35.2 |
| 2 | 32.306 | 5.15 | 1.49700 | 81.5 |
| 3 | −1123.138 | (Variable) | | |
| 4 | −55.824 | 0.80 | 1.77250 | 49.6 |
| 5 | 14.566 | 2.23 | 2.05090 | 26.9 |
| 6 | 27.140 | (Variable) | | |
| 7 (Diaphragm) | ∞ | 0.38 | | |
| 8 | 18.758 | 3.30 | 1.48749 | 70.2 |
| 9 | −38.617 | 2.78 | | |
| 10 | −18.849 | 1.00 | 1.84666 | 23.9 |
| 11 | −31.951 | (Variable) | | |
| 12 | 47.442 | 3.39 | 1.49700 | 81.5 |
| 13 | −16.471 | 1.17 | | |
| 14 | −15.881 | 1.90 | 1.53110 | 55.9 |
| 15* | −30.318 | (Variable) | | |
| 16 | −109.418 | 1.50 | 1.89286 | 20.4 |
| 17 | −33.181 | 0.70 | 1.77250 | 49.6 |
| 18 | 29.434 | (Variable) | | |
| Image Plane | ∞ | | | |

ASPHERICAL SURFACE DATA
15th Surface

K = 0.00000e+00 A4 = 4.11714e−05 A6 = 9.36576e−08
A8 = −3.25755e−09 A10 = 1.24523e−10 A12 = −1.30291e−12

VARIOUS DATA

Zoom Ratio 3.59

| | Wide Angle | Middle | Telephoto |
|---|---|---|---|
| Focal Length: | 55.70 | 91.48 | 200.00 |
| F-NUMBER: | 5.10 | 7.24 | 7.24 |

-continued

| Half Angle of View (°): | 13.78 | 8.49 | 3.91 |
|---|---|---|---|
| Image Height: | 13.66 | 13.66 | 13.66 |
| Overall Lens Length: | 110.96 | 126.34 | 153.10 |
| BF: | 26.82 | 39.34 | 58.77 |
| d3 | 17.43 | 32.81 | 59.57 |
| d6 | 21.33 | 14.70 | 4.18 |
| d11 | 7.98 | 4.47 | 2.08 |
| d15 | 11.61 | 9.24 | 2.71 |
| d18 | 26.82 | 39.34 | 58.77 |

ZOOM LENS UNIT DATA

| Unit | Starting Surface | Focal Length |
|---|---|---|
| 1 | 1 | 115.33 |
| 2 | 4 | −29.99 |
| 3 | 7 | 44.52 |
| 4 | 12 | 40.10 |
| 5 | 16 | −32.29 |

Numerical Example 4

Unit mm
SURFACE DATA

| Surface Number | r | d | nd | vd |
|---|---|---|---|---|
| 1 | 48.458 | 1.50 | 1.91082 | 35.2 |
| 2 | 35.037 | 5.15 | 1.49700 | 81.5 |
| 3 | −366.330 | (Variable) | | |
| 4 | −56.903 | 0.80 | 1.77250 | 49.6 |
| 5 | 16.111 | 2.23 | 2.05090 | 26.9 |
| 6 | 31.017 | (Variable) | | |
| 7 (Diaphragm) | ∞ | 0.38 | | |
| 8 | 23.604 | 3.30 | 1.48749 | 70.2 |
| 9 | −38.962 | 3.39 | | |
| 10 | −19.447 | 1.00 | 1.84666 | 23.9 |
| 11 | −33.056 | (Variable) | | |
| 12 | 58.134 | 3.39 | 1.49700 | 81.5 |
| 13 | −19.972 | 1.08 | | |
| 14 | −24.146 | 1.90 | 1.53110 | 55.9 |
| 15* | −36.705 | (Variable) | | |
| 16 | −173.201 | 1.50 | 1.89286 | 20.4 |
| 17 | −42.875 | 0.70 | 1.77250 | 49.6 |
| 18 | 34.214 | (Variable) | | |
| 19 | −20.708 | 2.00 | 1.67118 | 59.7 |
| 20 | −23.875 | (Variable) | | |
| Image Plane | ∞ | | | |

ASPHERICAL SURFACE DATA
15th Surface

K = 0.00000e+00 A4 = 2.95366e−05 A6 = 1.01448e−07
A8 = −4.38121e−09 A10 = 1.20732e−10 A12 = −1.07166e−12

VARIOUS DATA

Zoom Ratio 4.10

| | Wide Angle | Middle | Telephoto |
|---|---|---|---|
| Focal Length: | 51.47 | 114.27 | 210.87 |
| F-NUMBER: | 5.10 | 6.43 | 7.24 |
| Half Angle of View (°): | 14.86 | 6.82 | 3.71 |
| Image Height: | 13.66 | 13.66 | 13.66 |
| Overall Lens Length: | 102.52 | 139.32 | 160.37 |
| BF: | 15.54 | 14.18 | 20.68 |
| d3 | 2.00 | 38.81 | 59.86 |
| d6 | 20.60 | 13.52 | 4.06 |
| d11 | 9.66 | 3.63 | 1.00 |

-continued

| d15 | 16.75 | 9.01 | 2.11 |
|---|---|---|---|
| d18 | 9.65 | 31.86 | 44.34 |
| d20 | 15.54 | 14.18 | 20.68 |

ZOOM LENS UNIT DATA

| Unit | Starting Surface | Focal Length |
|---|---|---|
| 1 | 1 | 118.16 |
| 2 | 4 | −33.18 |
| 3 | 7 | 57.05 |
| 4 | 12 | 39.03 |
| 5 | 16 | −39.96 |
| 6 | 19 | −311.63 |

Numerical Example 5

Unit mm
SURFACE DATA

| Surface Number | r | d | nd | vd |
|---|---|---|---|---|
| 1 | 46.460 | 1.50 | 1.91082 | 35.2 |
| 2 | 34.450 | 5.15 | 1.49700 | 81.5 |
| 3 | −575.893 | (Variable) | | |
| 4 | −55.662 | 0.80 | 1.77250 | 49.6 |
| 5 | 15.390 | 2.23 | 2.05090 | 26.9 |
| 6 | 28.747 | (Variable) | | |
| 7 (Diaphragm) | ∞ | 0.38 | | |
| 8 | 19.339 | 3.30 | 1.48749 | 70.2 |
| 9 | −60.917 | 2.42 | | |
| 10 | −18.996 | 1.00 | 1.84666 | 23.9 |
| 11* | −30.810 | (Variable) | | |
| 12 | 40.899 | 3.39 | 1.49700 | 81.5 |
| 13 | −20.594 | 3.03 | | |
| 14 | −20.033 | 1.90 | 1.53110 | 55.9 |
| 15* | −31.946 | (Variable) | | |
| 16 | −61.564 | 1.50 | 1.89286 | 20.4 |
| 17 | −26.333 | 0.70 | 1.77250 | 19.6 |
| 18 | 25.922 | (Variable) | | |
| 19 | −427.813 | 2.34 | 1.58419 | 69.2 |
| 20 | −51.504 | (Variable) | | |
| Image Plane | ∞ | | | |

ASPHERICAL SURFACE DATA
11st Surface

K = 0.00000e+00 A4 = 1.89753e−07 A6 = −1.83776e−08
A8 = 1.98799e−10

15th Surface

K = 0.00000e+00 A4 = 4.67419e−05 A6 = 1.45817e−07
A8 = −7.40629e−09 A10 = 2.95336e−10 A12 = −3.48988e−12

VARIOUS DATA

Zoom Ratio 4.06

| | Wide Angle | Middle | Telephoto |
|---|---|---|---|
| Focal Length: | 49.71 | 102.75 | 201.95 |
| F-NUMBER: | 5.10 | 6.27 | 7.24 |
| Half Angle of View (°): | 15.36 | 7.57 | 3.87 |
| Image Height: | 13.66 | 13.66 | 13.66 |
| Overall Lens Length: | 97.13 | 130.11 | 154.28 |
| BF: | 15.00 | 9.10 | 13.16 |
| d3 | 2.00 | 34.98 | 59.15 |
| d6 | 20.48 | 13.79 | 4.13 |
| d11 | 5.55 | 3.67 | 3.68 |
| d15 | 14.90 | 12.37 | 6.67 |

17

-continued

| | | | |
|---|---|---|---|
| d18 | 9.57 | 26.57 | 37.86 |
| d20 | 15.00 | 9.10 | 13.16 |

ZOOM LENS UNIT DATA

| Unit | Starting Surface | Focal Length |
|---|---|---|
| 1 | 1 | 116.23 |
| 2 | 4 | −30.97 |
| 3 | 7 | 55.34 |
| 4 | 12 | 37.30 |
| 5 | 16 | −24.91 |
| 6 | 19 | 100.00 |

Various values of each numerical example are summarized in Tables 1 and 2.

TABLE 1

| | Ex. 1 | Ex. 2 | Ex. 3 | Ex. 4 | Ex. 5 |
|---|---|---|---|---|---|
| fw | 55.724 | 55.700 | 55.700 | 51.472 | 49.711 |
| ft | 202.991 | 203.699 | 200.000 | 210.871 | 201.948 |
| TTLt | 154.013 | 152.604 | 153.100 | 160.371 | 154.276 |
| $\beta 2w$ | −0.477 | −0.551 | −0.490 | −0.432 | −0.403 |
| $\beta 3w$ | 15.672 | 2.108 | −2.243 | −6.802 | −8.360 |
| $\beta 4w$ | −0.032 | −0.227 | 0.239 | 0.084 | 0.069 |
| $\beta 5w$ | 2.136 | 1.952 | 1.839 | 1.619 | 2.164 |
| $\beta 6w$ | — | — | — | 1.089 | 0.852 |
| $\beta 2t$ | −1.628 | −2.040 | −1.571 | −1.745 | −1.569 |
| $\beta 3t$ | −4.806 | 4.689 | −1.267 | −1.610 | −2.097 |
| $\beta 4t$ | 0.076 | −0.068 | 0.308 | 0.221 | 0.190 |
| $\beta 5t$ | 3.073 | 2.894 | 2.828 | 2.595 | 3.200 |
| $\beta 6t$ | — | — | — | 1.105 | 0.870 |
| f1 | 110.763 | 108.034 | 115.333 | 118.164 | 116.231 |
| f2 | −29.028 | −30.574 | −29.993 | −33.180 | −30.970 |
| f3 | 61.517 | 105.185 | 44.521 | 57.055 | 55.343 |
| f4 | 28.175 | 26.230 | 40.101 | 39.029 | 37.297 |
| f5 | −29.404 | −31.130 | −32.288 | −39.956 | −24.913 |
| M1 | −43.060 | −40.452 | −42.140 | −57.855 | −57.146 |
| M2 | 0.000 | 0.000 | 0.000 | 0.000 | 0.000 |
| M3 | −16.689 | −18.039 | −17.141 | −16.537 | −16.349 |
| M4 | −20.303 | −19.956 | −23.044 | −25.196 | −18.214 |
| M5 | −27.534 | −29.321 | −31.950 | −39.830 | −26.442 |
| M12 | 43.060 | 40.452 | 42.140 | 57.855 | 57.146 |
| M23 | −16.689 | −18.039 | −17.141 | −16.537 | −16.349 |
| M34 | −3.614 | −1.917 | −5.903 | −8.660 | −1.865 |
| M45 | −7.231 | −9.365 | −8.907 | −14.633 | −8.228 |

TABLE 2

| Inequality | Ex. 1 | Ex. 2 | Ex. 3 | Ex. 4 | Ex. 5 |
|---|---|---|---|---|---|
| (1) f1/f3 | 1.801 | 1.027 | 2.591 | 2.071 | 2.100 |
| (2) \|M34/M45\| | 0.500 | 0.205 | 0.663 | 0.592 | 0.227 |
| (3) TLt/ft | 0.759 | 0.749 | 0.766 | 0.761 | 0.764 |
| (4) \|$\beta 2wt/\beta Rwt$\| | 0.982 | 8.319 | 1.618 | 0.959 | 0.937 |
| (6) \|M1/M3\| | 2.580 | 2.242 | 2.458 | 3.499 | 3.495 |
| (6) f1/ft | 0.546 | 0.530 | 0.577 | 0.560 | 0.576 |
| (7) f3/ft | 0.303 | 0.516 | 0.223 | 0.271 | 0.274 |
| (8) f4/ft | 0.139 | 0.129 | 0.201 | 0.185 | 0.185 |
| (9) f5/ft | −0.145 | −0.153 | −0.161 | −0.189 | −0.123 |

Image Pickup Apparatus

Figure 16:
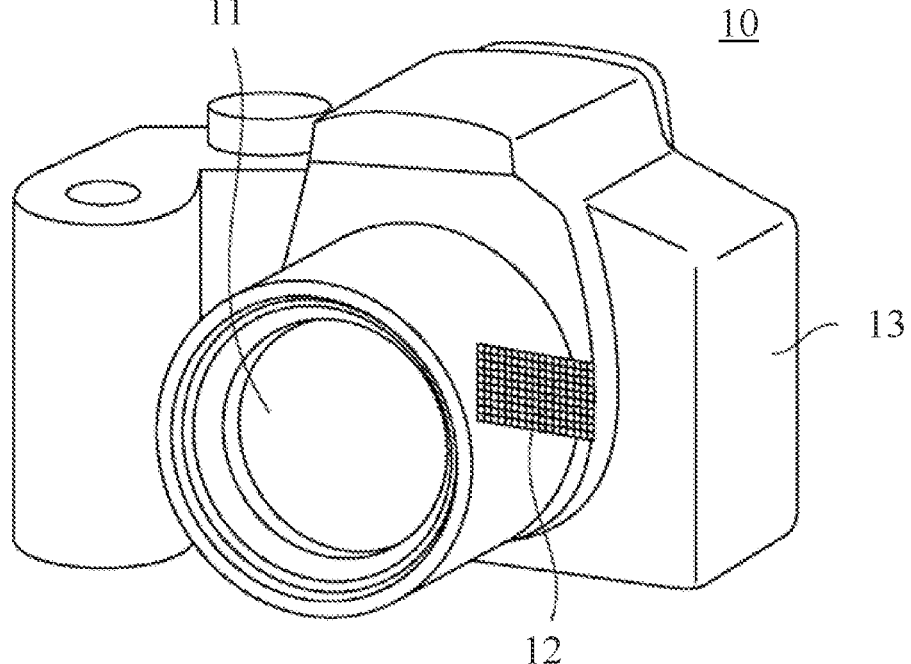
FIG. 16 is a schematic diagram of an image pickup apparatus.

Next, with reference to FIG. 16, a description is given of an embodiment of a digital still camera (image pickup apparatus) 10 using the zoom lens L0 of the present disclosure as an imaging optical system. In FIG. 16, a reference numeral 13 denotes a camera body, and a reference numeral 11 denotes an imaging optical system including any of the zoom lenses L0 according to Examples 1 through 5. A reference numeral 12 denotes a solid image sensor (photoelectric conversion element), such as a CCD sensor and a CMOS sensor, that is built into the camera body 13 and receives and photoelectrically converts an optical image formed by the imaging optical system 11. The camera body 13 may be a so-called single-lens reflex camera having a quick return mirror, or a so-called mirrorless camera not having a quick return mirror.

By applying the zoom lens L0 of the present disclosure to an image pickup apparatus such as a digital still camera as described above, an image pickup apparatus having a small lens can be acquired.

Image Pickup System

An image pickup system (surveillance camera system) may be configured to include the zoom lens L0 according to any of the examples and a control unit that controls the zoom lens L0. In this case, the control unit can control the zoom lens so that each lens unit moves as described above during zooming, focusing, or image stabilization. At this time, the control unit need not be integrated with the zoom lens L0, and the controller may be configured separately from the zoom lens L0. For example, a configuration may be such that a control unit (control apparatus) located away from a driving unit that drives each lens of the zoom lens L0 includes a transmission unit that transmits a control signal (instruction) for controlling the zoom lens L0. With such a control unit, the zoom lens L0 can be remotely controlled.

Furthermore, a configuration may be such that the control unit is provided with an operation unit such as a controller and buttons for remotely operating the zoom lens L0 and the zoom lens is controlled according to input by a user to the operation unit. For example, an enlargement button and a reduction button are provided as operation units. In this case, a configuration may be such that a signal is transmitted from the control unit to a driving unit of the zoom lens L0 so that when the user presses the enlargement button, the magnification of the zoom lens increases, and when the user presses the reduction button, the magnification of the zoom lens decreases.

The image pickup system may include a display unit, such as a liquid crystal panel, that displays information on zooming of the zoom lens L0 (moving state). The information on zooming of the zoom lens L0 is, for example, a zoom magnification (zooming state) and a moving amount (movement state) of each lens unit. In this case, the user can remotely operate the zoom lens L0 via the operation unit while viewing information on zooming of the zoom lens L0 displayed on the display unit. At this time, the display unit and the operation unit may be integrally configured by adopting a touch panel or the like.

According to the above-described embodiments, it is possible to provide a small and light zoom lens having high optical performance over an entire zoom range and a large zooming ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029164, filed on Feb. 28, 2022, which is hereby incorporated by reference herein in its entirety.

What is claimed is:

1. A zoom lens comprising, in order from an object side to an image side:

a first lens unit having a positive refractive power;

a second lens unit having a negative refractive power;

a third lens unit having a positive refractive power;

a fourth lens unit having a positive refractive power; and a fifth lens unit having a negative refractive power, wherein during zooming, each distance between adjacent lens units changes, wherein during zooming from a wide-angle end to a telephoto end, the first lens unit moves toward the object side, a distance between the third lens unit and the fourth lens unit decreases, and a distance between the fourth lens unit and the fifth lens unit decreases, wherein the number of optical elements each having a refractive power in the first lens unit is two or less, and wherein the following inequalities are satisfied:

$$0.50 < f1/f3 < 2.70$$

$$0.18 < |M34/M45| < 0.70$$

$$0.530 \leq f1/ft < 0.7$$

where f1 represents a focal length of the first lens unit, f3 represents a focal length of the third lens unit, M34 represents a changing amount in the distance between the third lens unit and the fourth lens unit during zooming from the wide-angle end to the telephoto end, M45 represents a changing amount in the distance between the fourth lens unit and the fifth lens unit during zooming from the wide-angle end to the telephoto end, and ft represents a focal length at the telephoto end of the zoom lens.

2. The zoom lens according to claim 1, wherein the following inequality is satisfied:

$$0.50 < TTLt/ft < 1.00$$

where TTLt represents a distance on an optical axis at the telephoto end from a surface closest to an object in the zoom lens to an image plane.

3. The zoom lens according to claim 1, wherein the following inequality is satisfied:

$$0.90 < |\beta 2wt/\beta Rwt| < 10.00$$

where β2wt represents a zooming sharing ratio of the second lens unit during zooming from the wide-angle end to the telephoto end, and βRwt represents a zooming sharing ratio of a combined lens unit of lens units from the fourth lens unit to a lens unit closest to an image plane during zooming from the wide-angle end to the telephoto end.

4. The zoom lens according to claim 1, wherein the following inequality is satisfied:

$$2.0 < |M1/M3| < 4.0$$

where M1 represents a moving amount of the first lens unit during zooming from the wide-angle end to the telephoto end, and M3 represents a moving amount of the third lens unit during zooming from the wide-angle end to the telephoto end.

5. The zoom lens according to claim 1, wherein the following inequality is satisfied:

$$0.18 < f3/ft < 0.70$$

where f3 represents a focal length of the third lens unit.

6. The zoom lens according to claim 1, wherein the following inequality is satisfied:

$$0.10 < f4/ft < 0.30$$

where f4 represents a focal length of the fourth lens unit.

7. The zoom lens according to claim 1, wherein the following inequality is satisfied:

$$-0.22 < f5/ft < -0.10$$

where f5 represents a focal length of the fifth lens unit.

8. The zoom lens according to claim 1, wherein an optical element having a positive refractive power is disposed at a position closest to an image plane in the first lens unit.

9. The zoom lens according to claim 1, wherein an aperture diaphragm is disposed between the second lens unit and the third lens unit.

10. The zoom lens according to claim 1, wherein during zooming from the wide-angle end to the telephoto end, the second lens unit does not move relatively to an image plane.

11. The zoom lens according to claim 1, wherein the number of lenses in the third lens unit is two or less.

12. The zoom lens according to claim 1, wherein the number of lenses in the fourth lens unit is two or less.

13. The zoom lens according to claim 1, wherein among lens surfaces in the third lens unit and the fourth lens unit, at least one lens surface is an aspherical surface.

14. The zoom lens according to claim 1, wherein during focusing from an object at an infinite distance to an object at a closest distance, the fifth lens unit moves.

15. The zoom lens according to claim 1, wherein during image stabilization, the second lens unit moves in a direction including a component of a direction orthogonal to an optical axis.

16. The zoom lens according to claim 1, wherein the zoom lens includes a plurality of lens units, and wherein the plurality of lens units consists of, in order from the object side to the image side, the first lens unit, the second lens unit, the third lens unit, the fourth lens unit, and the fifth lens unit.

17. The zoom lens according to claim 1, wherein the zoom lens includes a plurality of lens units, and wherein the plurality of lens units consists of, in order from the object side to the image side, the first lens unit, the second lens unit, the third lens unit, the fourth lens unit, the fifth lens unit, and a sixth lens unit.

18. An image pickup apparatus comprising:

a zoom lens; and an image sensor configured to receive light of an image formed by the zoom lens, wherein the zoom lens includes, in order from an object side to an image side:

a first lens unit having a positive refractive power;

a second lens unit having a negative refractive power;

a third lens unit having a positive refractive power;

a fourth lens unit having a positive refractive power; and a fifth lens unit having a negative refractive power, wherein during zooming, each distance between adjacent lens units changes, wherein during zooming from a wide-angle end to a telephoto end, the first lens unit moves toward the object side, a distance between the third lens unit and the fourth lens unit decreases, and a distance between the fourth lens unit and the fifth lens unit decreases, wherein the number of optical elements each having a refractive power in the first lens unit is two or less, and wherein the following inequalities are satisfied:

$$0.50 < f1/f3 < 2.70$$

$$0.18 < |M34/M45| < 0.70$$

$$0.530 \leq f1/ft < 0.7$$

where f1 represents a focal length of the first lens unit, f3 represents a focal length of the third lens unit, M34 represents a changing amount in the distance between the third lens unit and the fourth lens unit during zooming from the wide-angle end to the telephoto end, M45 represents a changing amount in the distance between the fourth lens unit and the fifth lens unit during zooming from the wide-angle end to the telephoto end, and ft represents a focal length at the telephoto end of the zoom lens.

* * * * *